(12) United States Patent
Williams et al.

(10) Patent No.: US 10,595,621 B2
(45) Date of Patent: Mar. 24, 2020

(54) FLORAL APPARATUS AND METHOD OF ASSEMBLING THE SAME

(71) Applicant: MGX Innovations, Wilkes-Barre, PA (US)

(72) Inventors: Matthew C. Williams, Dallas, PA (US); Jeffrey J. Pyros, Shavertown, PA (US); Daniel Slade Lykens, Kingston, PA (US); Michael Christopher Grobinski, Kingston, PA (US)

(73) Assignee: MGX INNOVATIONS, Wilkes-Barre, PA (US)

( * ) Notice: Subject to any disclaimer, the term of this patent is extended or adjusted under 35 U.S.C. 154(b) by 0 days.

(21) Appl. No.: 15/819,055

(22) Filed: Nov. 21, 2017

(65) Prior Publication Data

US 2018/0140081 A1    May 24, 2018

Related U.S. Application Data

(60) Provisional application No. 62/424,897, filed on Nov. 21, 2016.

(51) Int. Cl.
| | | |
|---|---|---|
| *A45F 5/08* | (2006.01) | |
| *A01G 5/02* | (2006.01) | |
| *A44B 9/10* | (2006.01) | |
| *A44B 9/02* | (2006.01) | |

(52) U.S. Cl.
CPC ................ *A45F 5/08* (2013.01); *A01G 5/02* (2013.01); *A44B 9/02* (2013.01); *A44B 9/10* (2013.01)

(58) Field of Classification Search
CPC .... A01G 5/02; A44B 9/02; A44B 9/10; A45F 5/08
See application file for complete search history.

(56) References Cited

U.S. PATENT DOCUMENTS

| | | | |
|---|---|---|---|
| 1,067,979 A | | 7/1913 | Ferguson |
| 1,633,616 A | * | 6/1927 | Sokol ...................... A45D 8/24 132/273 |
| 3,071,776 A | * | 1/1963 | Phillips ................ A41D 25/027 2/154 |
| 3,735,447 A | * | 5/1973 | Abraham .................. A44B 9/16 24/114.05 |
| 3,982,303 A | * | 9/1976 | Shulkin ..................... A45F 5/08 24/6 |
| 4,229,877 A | | 10/1980 | Fagan |

(Continued)

*Primary Examiner* — Robert Sandy
*Assistant Examiner* — David M Upchurch
(74) *Attorney, Agent, or Firm* — The Belles Group, P.C.

(57) ABSTRACT

An attachment device for coupling a floral arrangement to an article such as a lapel of a jacket, a floral apparatus that includes at least a portion of the attachment device and the floral arrangement, and a method of assembling such a floral apparatus. The attachment device may include a support element and a retaining element that are detachably coupled together. The support element includes a rib member and first and second posts extending from a bottom surface of the rib member in a spaced apart manner. The rib member and the first and second posts collectively define a receiving cavity that is configured to receive a portion of a stem of a floral arrangement. The retaining element includes one or more pins that extend into the rib member of the support element to couple the retaining element to the support element.

15 Claims, 20 Drawing Sheets

(56) References Cited

U.S. PATENT DOCUMENTS

| | | | |
|---|---|---|---|
| 4,559,675 A * | 12/1985 | Devenny | A45F 5/08 24/460 |
| 4,813,110 A * | 3/1989 | Schiller | A44B 17/0005 24/104 |
| 5,836,017 A | 11/1998 | Hironaga et al. | |
| 6,122,805 A * | 9/2000 | Haegley | A44B 17/0082 24/114.05 |
| 6,389,649 B1 | 5/2002 | Metzler | |
| 6,715,184 B1 | 4/2004 | Droschak | |
| D550,121 S * | 9/2007 | Minneci | D11/200 |
| 7,685,682 B2 | 3/2010 | Kiersz | |
| 8,032,992 B2 * | 10/2011 | Willour | A45F 5/08 24/5 |
| 8,667,649 B2 | 3/2014 | Cooper et al. | |
| 2006/0185234 A1 | 8/2006 | Fitzgerald | |
| 2007/0101643 A1 | 5/2007 | Yowney et al. | |
| 2008/0022494 A1 | 1/2008 | Annett et al. | |
| 2009/0217488 A1 | 9/2009 | Bryczek | |
| 2012/0023708 A1 | 2/2012 | Crilly | |

* cited by examiner

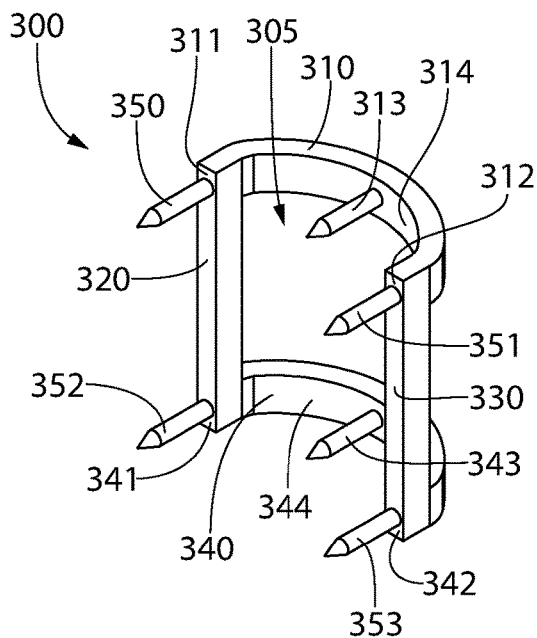
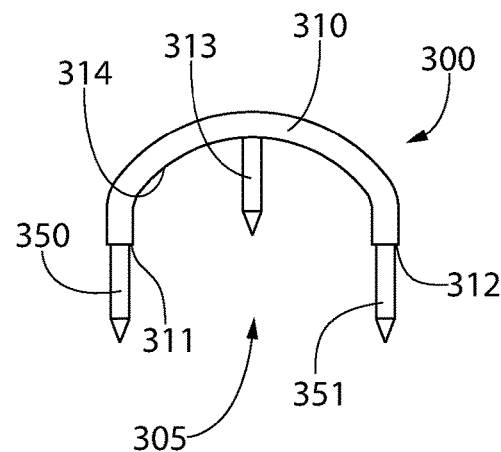
FIG. 11A
FIG. 11B
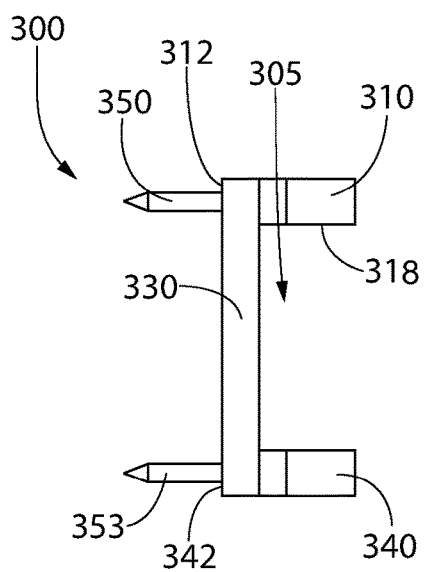
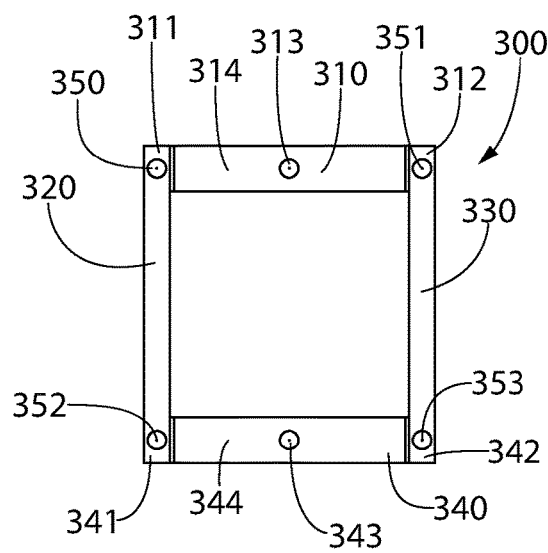
FIG. 11C
FIG. 11D

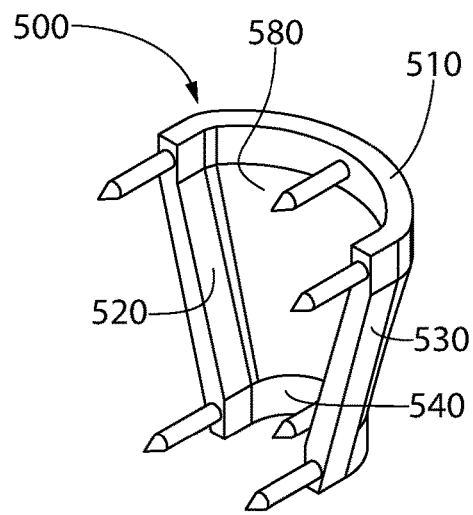
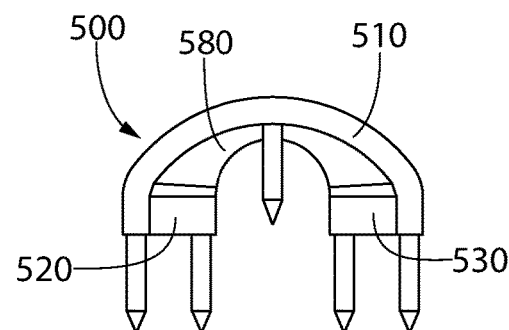
FIG. 13A    FIG. 13B
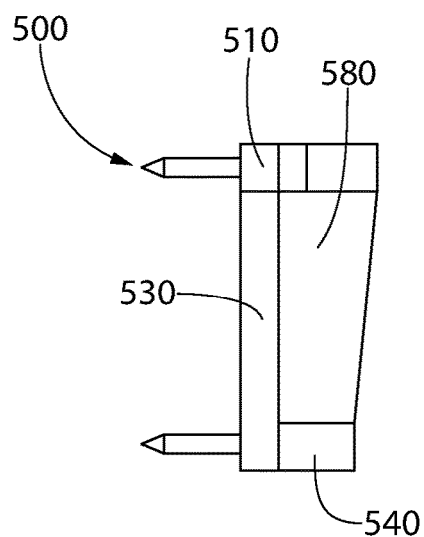
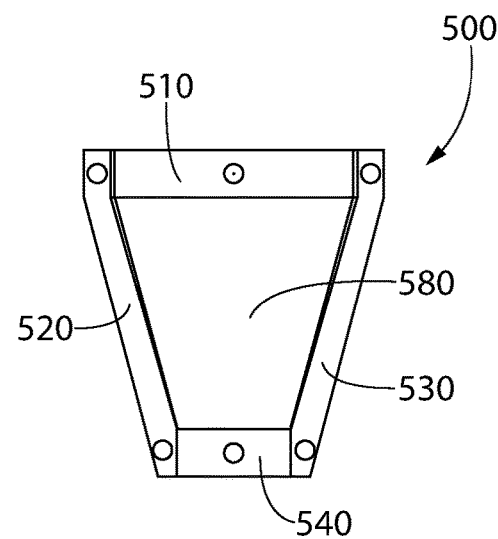
FIG. 13C    FIG. 13D

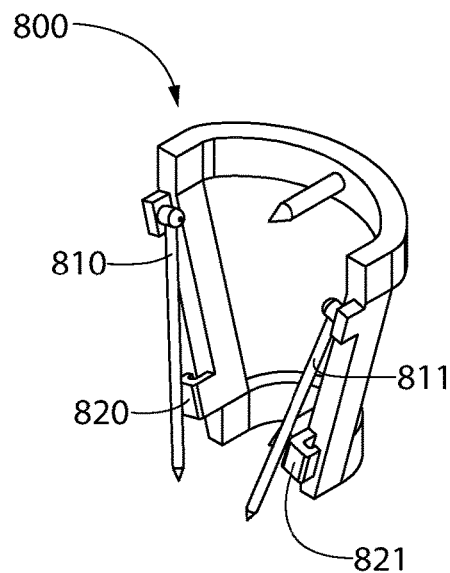
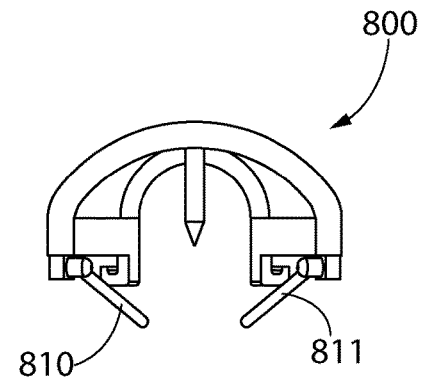
FIG. 15A    FIG. 15B
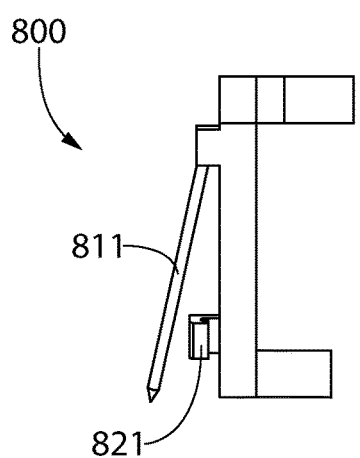
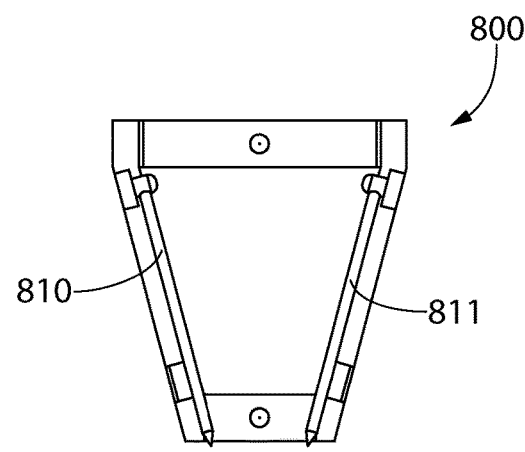
FIG. 15C    FIG. 15D

FLORAL APPARATUS AND METHOD OF ASSEMBLING THE SAME

CROSS-REFERENCE TO RELATED APPLICATIONS

The present application claims the benefit of U.S. Provisional Patent Application Ser. No. 62/424,897, filed Nov. 21, 2016, the entirety of which is hereby incorporated by reference.

FIELD OF THE INVENTION

The present invention relates generally to an attachment device for coupling a floral arrangement to an article, a floral apparatus that includes the attachment device and the floral arrangement, and a method of assembling such a floral apparatus.

BACKGROUND OF THE INVENTION

Most men will wear a flower on the lapel of their jacket only a handful of times in their life. They will have it forced upon them for a formal event such as a high school or college prom, where it will be pinned to the lapel for a photo and then ignored, or for a wedding where it will be pinned on by a member of the bride's party for the length of the ceremony. It is a shame as the boutonniere should be utilized more often as a fashion accessory for an otherwise fairly bland men's formal outfit. The boutonniere is a stylish gesture full of meaning—it is the symbol of fragile life, of beauty in nature, or of love undefined, always worn above the heart. It has been and continues to be a statement of elegance and flair.

A boutonniere is traditionally worn on the left lapel of a tuxedo, suit, or sports jacket. In the past and in today's higher-end suits, the flower is worn in a special buttonhole on the lapel. The stem of the flower extends inside of the buttonhole and is held in place by a small loop of thread on the inside of the lapel. Today's mass manufacturers, however, typically do not actually cut the hole in the lapel or else have a hole that has been stitched shut. To have a hole sufficiently reinforced to support the weight of the boutonniere would add additional expense to the suit for an item so seldom worn. In order to actually wear a boutonniere, most men are forced to pin the flower to the lapel with long straight pins. Once considered unsightly, this solution has become acceptable due to the lack of alternatives and the florists' ability to make the stem of the flower less visible. The use of the single straight pin coupled with the weight of the flower and the flimsy fabric of most lapels, however, often results in drooping and crooked flowers, not to mention the danger of the wearer (or his dancing partner) being stabbed with the pin. Additionally, if the suit or tuxedo is a rental, the wearer is held responsible if the straight pin holding the flower tears or damages the fabric of the suit. Tears in the lapel as a result of the pin/flower are a leading cause of damage to rental suits and tuxedos, more so than spills, and result in additional costs to the renter and to the rental shop owner.

Thus, a need exists for a device for securing a floral arrangement to a tuxedo, suit, sports jacket, or other article of clothing that overcomes the deficiencies noted above.

BRIEF SUMMARY OF THE INVENTION

The present invention is directed to an attachment device for coupling a floral arrangement to an article such as a lapel of a jacket, a floral apparatus that includes at least a portion of the attachment device and the floral arrangement, and a method of assembling such a floral apparatus. The attachment device may include a support element and a retaining element that are detachably coupled together. The support element includes a rib member and first and second posts extending from a bottom surface of the rib member in a spaced apart manner. The rib member and the first and second posts collectively define a receiving cavity that is configured to receive a portion of a stem of a floral arrangement. The retaining element includes one or more pins that extend into the rib member of the support element to couple the retaining element to the support element.

In one embodiment, the invention may be an attachment device for coupling a floral arrangement to an article, the attachment device comprising: a support element comprising: a rib member having a bottom surface, a first aperture, and a second aperture; a first post extending from the bottom surface of the rib member; and a second post extending from the bottom surface of the rib member, the second post being spaced apart from the first post, wherein a receiving cavity is defined by the rib member and the first and second posts; a retaining element comprising a body and first and second pins extending from the body; and wherein the retaining element is detachably coupled to the support element with the first pin of the retaining element extending through the first aperture of the rib member and the second pin of the retaining element extending through the second aperture of the rib member.

In another embodiment, the invention may be a floral apparatus comprising: a support element comprising a rib member having a bottom surface, a first post extending from the bottom surface of the rib member and a second post extending from the bottom surface of the rib member, the first and second posts being spaced apart from one another, the rib member and the first and second posts collectively defining a receiving cavity; and a floral arrangement comprising at least one floral element and a stem extending along an axis, wherein a first portion of the stem is located within the receiving cavity of the support element between the first and second posts of the support element and the at least one floral element protrudes beyond a top surface of the support element.

In still another embodiment, the invention may be a method of assembling a floral apparatus comprising: providing a support element comprising a rib member having a bottom surface and first and second posts extending from the bottom surface of the rib member in a spaced apart manner, the rib member and the first and second posts collectively defining a receiving cavity; positioning a first portion of a stem of a floral arrangement into the receiving cavity of the support element such that the first portion of the stem is located between the first and second posts; and wrapping a wrap element around the support element and the portion of the stem until an entirety of the support element is covered by the wrap element, thereby coupling the floral arrangement to the support element.

In yet another embodiment, the invention may be an attachment device for coupling a floral arrangement to an article, the attachment device comprising: a support element comprising: a rib member extending from a first end to a second end and having a bottom surface; a first post extending from the bottom surface of the rib member adjacent the first end of the rib member; and a second post extending from the bottom surface of the rib member adjacent the second end of the rib member, wherein a receiving cavity is defined by the rib member and the first and second posts; and a retaining element; wherein one of the rib member and the retaining element comprises at least one aperture and the other one of the rib member and the retaining element comprises at least one pin; and wherein the retaining element is detachably coupled to the support element with the at least one pin extending through the at least one aperture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 11A is a perspective view of a support element of an attachment device for coupling a floral arrangement to an article in accordance with another embodiment of the present invention;

FIG. 11B is a top view of the support element of FIG. 11A;

FIG. 11C is a side view of the support element of FIG. 11A;

FIG. 11D is a front view of the support element of FIG. 11A;

FIG. 13A is a perspective view of a support element of an attachment device for coupling a floral arrangement to an article in accordance with still another embodiment of the present invention;

FIG. 13B is a top view of the support element of FIG. 13A;

FIG. 13C is a side view of the support element of FIG. 13A;

FIG. 13D is a front view of the support element of FIG. 13A;

FIG. 15A is a perspective view of an attachment device for coupling a floral arrangement to an article in accordance with a still further embodiment of the present invention;

FIG. 15B is a top view of the support element of FIG. 15A;

FIG. 15C is a side view of the support element of FIG. 15A;

FIG. 15D is a front view of the support element of FIG. 15A;

DETAILED DESCRIPTION OF THE INVENTION

Figure 1A:
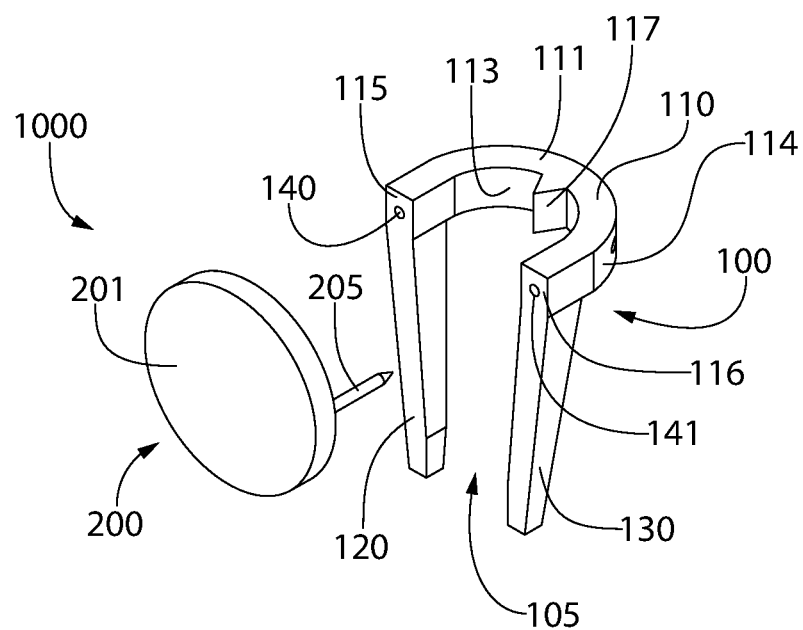
FIG. 1A is a perspective view of an attachment device comprising a support element and a retaining element for coupling a floral arrangement to an article in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 1B:
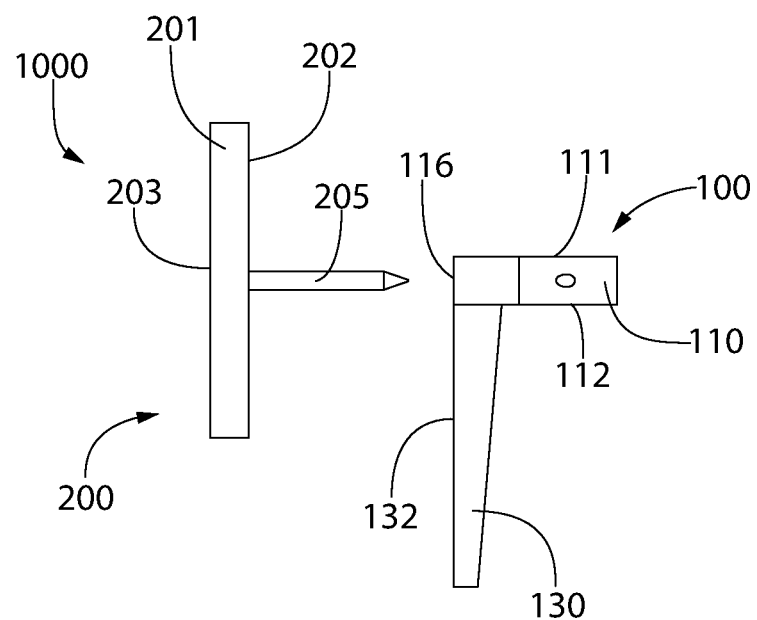
FIG. 1B is a side view of the attachment device of FIG. 1A.

Referring to FIGS. 1A and 1B, an attachment device 1000 for coupling a floral arrangement to an article is illustrated. The attachment device 1000 generally comprises a support element 100 and a retaining element 200 that are detachably coupled together. More specifically, in this particular embodiment the support element 100 is configured to be coupled to a floral arrangement and then the support element 100 and the retaining element 200 are placed on opposite sides of an article, such as the lapel of a suit jacket, and coupled together to thereby couple the floral arrangement to the article. When coupled to the article, the retaining element 200 is located on one side of the article and the support element 100 and the floral arrangement are located on the opposite side of the article.

Thus, as will be understood from the description provided herein along with the drawings, the attachment device 1000 is generally intended to couple or otherwise secure a floral arrangement to the lapel of a man's suit jacket. Specifically, during formal events men may wear a floral arrangement, such as a boutonniere, on the lapel of their suit jacket in order to enhance the elegance of the formal wear. Anyone who has ever attempted to use a straight pin to couple a boutonniere to the lapel of a jacket understands the difficulties involved. The attachment device 1000 simplifies this process and ensures that the boutonniere is coupled to the lapel in an extremely secure manner. Thus, the jacket can be shaken, thrown about, or otherwise jostled without causing the floral arrangement to separate from the lapel of the jacket.

Of course, although the attachment device 1000 is being described herein for coupling a floral arrangement or boutonniere to the lapel of a man's jacket or sport coat, the invention is not to be so limited. The attachment device 1000 can be used to couple a floral arrangement to any article of clothing, whether it is worn by a man or by a woman, and is not limited to only being coupled to a lapel but could be coupled directly to a shirt, a dress, or any other article of clothing. Furthermore, the attachment device 1000 could also be used to couple a floral arrangement to a non-clothing type article, such as a textile or the like. For example, the attachment device 1000 could be used to couple a floral arrangement to a curtain or a textile-type room divider for decorative purposes.

Referring to FIGS. 1A-2C concurrently, the support element 100 of the attachment device 1000 will be further described. In the exemplified embodiment, the support element 100 is formed entirely from plastic and it is manufactured via injection molding. Of course, the invention is not to be so limited in all embodiments and other materials and manufacturing techniques can be used. For example, the support element 100 could be formed from wood, metal, or any other desired material so long as it is capable of supporting a floral arrangement as described herein.

The support element 1000 comprises a rib member 110, a first post 120, and a second post 130. In the exemplified embodiment, each of the rib member 110, the first post 120, and the second post 130 has a square or rectangular transverse cross-sectional shape. However, the invention is not to be so limited by the illustrated cross-sectional shapes for the rib member 110 and the first and second posts 120, 130 in all embodiments. Thus, the rib member 110, the first post 120, and the second post 130 may have alternative cross-sectional shapes, such as circular, triangular, pentagonal, hexagonal, or the like.

The rib member 110 comprises a top surface 111, a bottom surface 112, an inner surface 113, and an outer surface 114. The bounds of each of these surfaces are readily discernible in the exemplified embodiment due to the rib member 110 having a square cross-sectional shape such that the surfaces are defined between edges. However, even if the rib member 110 had a circular cross-sectional shape devoid of any edges, the exterior surface of the rib member 110 could still be conceptually divided into top, bottom, inner, and outer surfaces similar to those shown in the exemplified embodiment. In such an embodiment, the term top surface may simply be a portion of the outer surface of the rib member 110 that is located at the top, the term bottom surface may simply be a portion of the outer surface of the rib member 110 that is located at the bottom, and the same goes for the terms inner surface and outer surface.

In the exemplified embodiment, the rib member 110 extends from a first end 115 to a second end 116. Furthermore, the rib member 110 has an arcuate shape. Specifically, in the exemplified embodiment the inner surface 113 of the rib member 110 is concave and the outer surface 114 of the rib member 110 is convex. More specifically, the inner surface 113 is a continuously concave surface extending from the first end 115 to the second end 116 and the outer surface 114 is a continuously convex surface extending from the first end 115 to the second end 116. Of course, the invention is not to be so limited in all embodiments and the rib member 110 need not be continuously arcuate or even arcuate at all in all embodiments. In other embodiments, the rib member 110 could comprise two linear members that intersect to form a V-shape. In still other embodiments, the rib member 110 could comprise three linear members that generally form a U-shape. The inner and outer surfaces 113, 114 of the rib member 110 may be wavy instead of smooth. In still further embodiments, the rib member 110 may not have first and second ends 115, 116 but rather it may form a closed geometry such as being circular, square, or the like in shape. Other variations are possible for the rib member 110. However, it may be desirable for the inner surface 113 of the rib member 110 to at least partially surround an open space so as to define a portion of a receiving cavity 105, described in more detail below.

In the exemplified embodiment, the rib member 110 comprises a protuberance 117 that protrudes from the inner surface 113 of the rib member 110. In the exemplified embodiment, the protuberance 117 is triangular and its distal end 118 located furthest from the inner surface 113 of the rib member 110 forms a point. However, the invention is not to be so limited in all embodiments and the protuberance 117 may be a truncated triangle, rounded nub, a straight pin (see, for example, FIG. 11A), or some other shape in other embodiments. The protuberance 117 is centrally located along the inner surface 113 of the rib member 110 so as to be equidistant from each of the first and second posts 120, 130, although this is not required in all embodiments. The protuberance 117 may function to facilitate the positioning of a stem of a floral arrangement when the attachment device 1000 is being used to couple a floral arrangement to an article, described more fully herein below with reference to FIGS. 4-10. Specifically, when the stem of a floral arrangement is located within the receiving cavity 105 of the support member 100, the protuberance 117 will abut against the stem and may even slightly penetrate the stem to hold it in place. Of course, it should be appreciated that the protuberance 117 may be omitted in some embodiments as it is not essential to proper function of the attachment device 1000 in all embodiments.

The first post 120 extends from the bottom surface 112 of the rib member 110 to a distal end 121 and the second post 130 extends from the bottom surface 112 of the rib member 110 to a distal end 131. In this embodiment, the distal ends 121, 131 of the first and second posts 120, 130 are free in that they are not attached to any other structure. Thus, the first and second posts 120, 130 hang freely from the rib member 110 and it is therefore possible to flex the first and second posts 120, 130 towards and away from one another. The first and second posts 120, 130 are spaced apart from one another along their entire lengths. Thus, in the exemplified embodiment the first post 120 extends form the bottom surface 112 of the rib member 110 adjacent to the first end 115 of the rib member 110 and the second post 130 extends form the bottom surface 112 of the rib member 110 adjacent to the second end 116 of the rib member 110. In the exemplified embodiment, the portion of the bottom surface 112 of the rib member 110 that is located between the first and second posts 120, 130 remains exposed.

In the exemplified embodiment, the first post 120 is positioned so that a front surface 122 of the first post 120 is flush with the first end 115 of the rib member 110 and the second post 130 is positioned so that a front surface 132 of the second post 120 is flush with the second end 116 of the rib member 110. Of course, the invention is not to be so limited in all embodiments and the front surfaces 122, 132 of the first and second posts 120, 130 could be offset from the first and second ends 115, 116 of the rib member 110. Thus, the front surfaces 122, 132 of the first and second posts 120, 130 could be recessed relative to the first and second ends 115, 116 of the rib member 110 or the front surfaces 122, 132 of the first and second posts 120, 130 could protrude beyond the first and second ends 115, 116 of the rib member 110 in variations to the exemplified embodiment.

As noted above, in the exemplified embodiment the first and second posts 120, 130 are spaced apart from one another along their entire lengths. Specifically, the first post 120 comprises a first side surface 123 and the second post 130 comprises a second side surface 133 such that the first side surfaces 123, 133 of the first and second posts 120, 130 face one another. The first side surfaces 123, 133 of the first and second posts 120, 130 are spaced apart from one another along the entire length of the first and second posts 120, 130 from the bottom surface 112 of the rib member 110 to the distal ends 121, 131 of the first and second posts 120, 130. However, the first and second posts 120, 130 are not parallel to one another. Rather, the first side surfaces 123, 133 of the first and second posts 120, 130 are spaced apart by a distance D1 that continually decrease with increasing distance from the bottom surface 112 of the rib member 110 for at least a portion of the length of the first and second posts 120, 130.

Stated another way, the first post 120 comprises an upper portion 124 that is adjacent to the rib member 110 and a lower portion 125 that extends from the upper portion 124 to the distal end 121 of the first post 120. Similarly, the second post 130 comprises an upper portion 134 that is adjacent to the rib member 110 and a lower portion 135 that extends from the upper portion 134 to the distal end 131 of the second post 120. The distance D1 between the first side surfaces 123, 133 of the first and second posts 120, 130 continually decreases with increasing distance from the bottom surface 112 of the rib member 110 along the upper portions 124, 134 of the first and second posts 120, 130. Furthermore, the distance D1 between the first side surfaces 123, 133 of the first and second posts 120, 130 is constant along the lower portions 125, 135 of the first and second posts 120, 130. Of course, the distance D1 may continue to decrease along the lower portions 125, 135 of the first and second posts 120, 130 in alternative embodiments.

The specific orientation of the first and second posts 120, 130 and the distance between them is not intended to be limiting of the present invention in all embodiments. In other embodiments, the first and second posts 120, 130 may extend perpendicularly from the rib member 110 so that the distance between the first and second posts 120, 130 is constant along the entire length of the first and second posts 120, 130. The distance between the first and second posts 120, 130 may also increase with increasing distance from the rib member 112 in some embodiments. Thus, alternatives to that which is shown in the exemplified embodiment fall within the scope of the claimed invention unless otherwise specified in the claims.

As mentioned above, the rib member 110 and the first and second posts 120, 130 collectively define a receiving cavity 105 that is configured to receive a stem of a floral arrangement, described in more detail below with reference to FIGS. 4-10. More specifically, the receiving cavity 105 is defined by the inner surface 113 of the rib member 110 and the first side surfaces 123, 133 of the first and second posts 120, 130. When the stem of the floral arrangement is located within the receiving cavity 105, the first and second posts 120, 130 are located on opposite sides of the stem and the rib member 110 circumferentially surrounds at least a portion of the stem.

In the exemplified embodiment, there are only two posts extending from the bottom surface 112 of the rib member 110. As a result, the support member 100 is flexible in that the first and second posts 120, 130 can flex relative to one another and the rib member 110 can flex by moving the first and second ends 115, 116 of the rib member 100 closer together or further apart. This flexibility is desirable as it enables different sized stems of floral arrangements to fit within the receiving cavity 105 as the diameter of the rib member 110 and the spacing between the first and second posts 120, 130 is modified. However, in other embodiments more than two posts may extend from the bottom surface 112 of the support member 110, such as three posts, four posts, or the like. Furthermore, in still other embodiments instead of distinct posts, a continuous wall may extend from the bottom surface 112 of the support member 110 along a majority of or the entirety of the bottom surface 112. Although this will result in a reduced flexibility for the support member 100, it will make the support member 100 stronger and more rigid which may enhance its ability to secure a floral arrangement to an article.

In the exemplified embodiment, the support structure 100 comprises a first aperture 140 formed into the first end 115 of the rib member 110 and a second aperture 141 formed into the second end 116 of the rib member 110. The first aperture 140 forms an opening in the first end 115 of the rib member 110 that may lead to a first passageway 142 (shown in phantom in FIG. 2B and also shown in FIG. 2C). The second aperture 141 forms an opening in the second end 116 of the rib member 110 that may lead to a second passageway 143 (shown in phantom in FIG. 2B). In some embodiments, the first and second passageways 142, 143 may be pre-formed into the rib member 110 during manufacture of the support element 100. However, in other embodiments the first and second passageways 142, 143 may not be formed until pins of the retaining element 200 are forced through the first and second apertures 140, 141, thereby forming the passageways.

The support element 100 may come in different sizes in order to be coupled to floral arrangements having different sized stems. Specifically, different support elements 100 may be formed with a different linear distance D2 between the first and second apertures 140, 141. In one embodiment, the linear distance D2 may be between 0.35 inches and 0.4 inches (more specifically approximately 0.37 inches), in other embodiments the linear distance D2 may be between 0.48 inches and 0.52 inches (more specifically approximately 0.5 inches), and in still other embodiments the linear distance D2 may be between 0.59 inches and 0.65 inches (more specifically approximately 0.62 inches). Of course, ranges outside of those noted herein are also possible and the support element 100 may be formed with any desired dimensions to enable floral arrangement stems of varying diameter or thickness to fit within the receiving cavity 105 thereof.

Furthermore, other possible dimensions include a height H1 of between 0.75 inches and 1.0 inches, and more specifically between 0.8 inches and 0.9 inches, and still more specifically approximately 0.86 inches and a width W1 of between 0.5 inches and 0.7 inches, and more specifically approximately 0.59 inches. Of course, height H1 and width W1 dimensions outside of these ranges are also possible in other embodiments.

Although in the exemplified embodiment the first and second apertures 140, 141 are formed into the first and second ends 115, 116 of the rib member 110, the invention is not to be so limited in all embodiments. In other embodiments, the first and second apertures 140, 141 may be formed into the first and second posts 120, 130. Furthermore, in still other embodiments the support element 100 may comprise first and second pins rather than the first and second apertures 140, 141. Thus, for example, first and second pins may extend from the first and second ends 115, 116 of the rib member 110. Examples of some alternative embodiments will be described below with reference to FIGS. 11A-15D. The idea is that one of the rib member 110 and the retaining element 200 comprises one or more apertures and the other one of the rib member 110 and the retaining element 200 comprises one or more pins that interact/mate with the one or more apertures to detachably couple the retaining element 200 to the support element 100.

Thus, in the exemplified embodiment whereby the rib member 110 comprises the first and second apertures 140, 141, the retaining element 200 comprises first and second pins (described below). In other embodiments whereby the rib member 100 may comprise first and second pins, the retaining element 200 may comprise first and second apertures to receive the first and second pins of the rib member 200 (see, for example, FIGS. 11E and 12E).

Figure 2A:
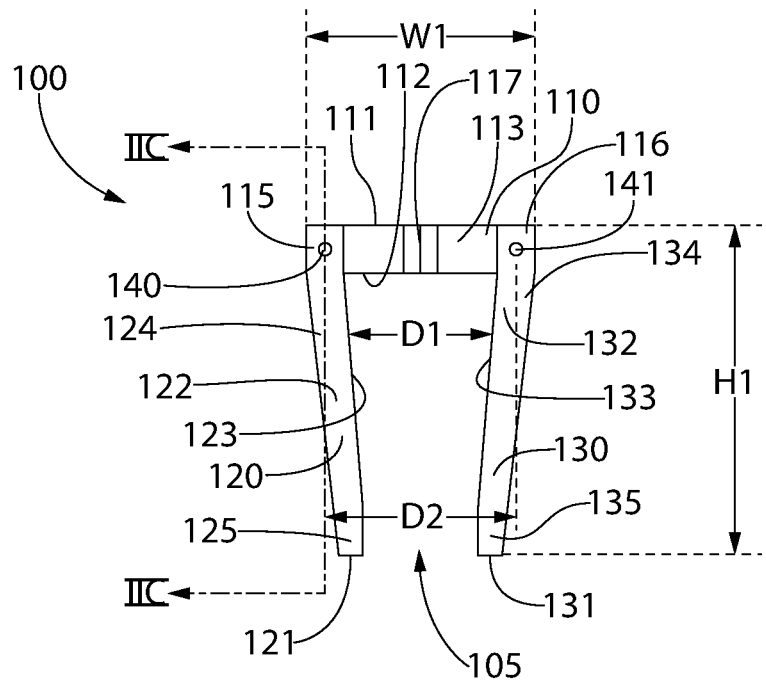
FIG. 2A is a front view of the support element of the attachment device of FIG. 1A.
Figure 2B:
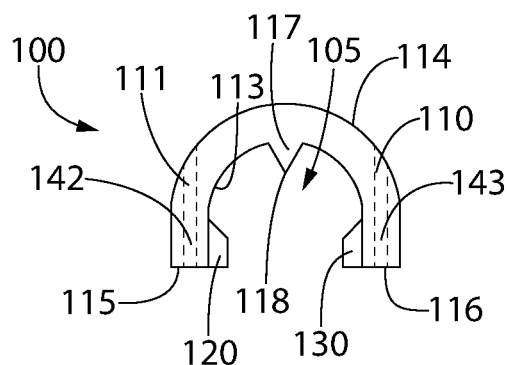
FIG. 2B is a top view of the support element of the attachment device of FIG. 1A.
Figure 2C:
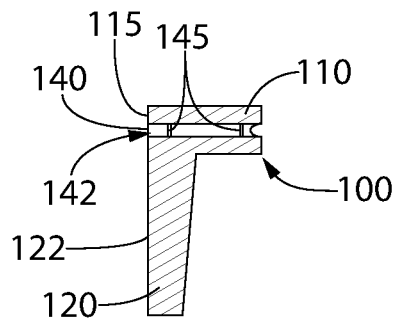
FIG. 2C is a cross-sectional view taken along line IIC-IIC of FIG. 2A.
Figure 3A:
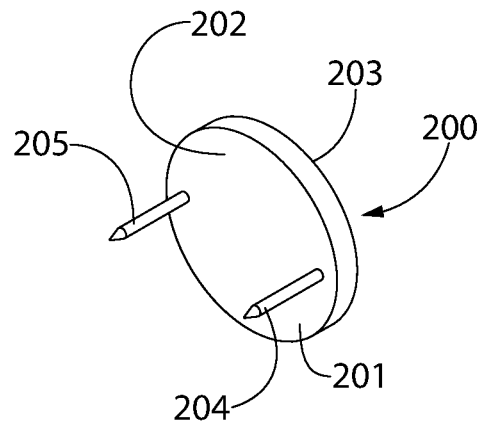
FIG. 3A is a perspective view of the retaining element of the attachment device of FIG. 1A.
Figure 3B:
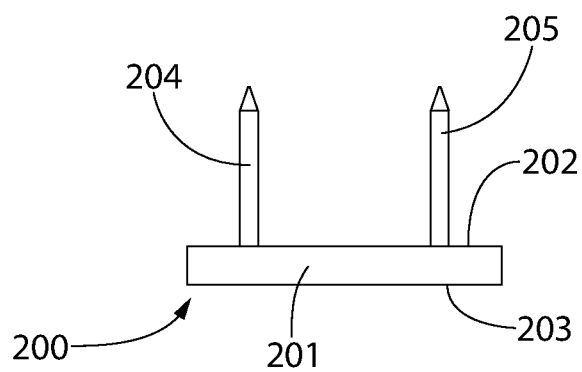
FIG. 3B is a top view of the retaining element of the attachment device of FIG. 1A.

As noted above, in the exemplified embodiment the first aperture 140 forms an opening into a first passageway 142 and the second aperture 141 forms an opening into a second passageway 143. Referring to FIG. 2C, in some embodiments one or more crush washers or lock washers 145 may be disposed within the first and/or second passageways 142, 143 to enhance engagement between the pins of the retaining element 200 and the passageways 142, 143 of the rib member 110 of the support element 100. Such crush washers or lock washers 145 may be formed of metal such as aluminum or copper or other materials. The crush or lock washers 145 may directly engage the pins of the retaining element 200 to prevent the retaining element 200 from being detached from the support element 100 unless a user applies a force to one of the retaining element 200 and the support element 100 while holding the other one of the retaining element 200 and the support element 100 stationary. Thus, when included, the crush or lock washers 145 make it more difficult to detach the retaining element 200 from the support element 100 (although it can still be done), which helps to ensure that the floral arrangement remains in position on the article (i.e., jacket lapel) until its removal is desired and done intentionally.

Referring to FIGS. 1A, 1B, 3A, and 3B, the retaining element 200 will be described. In the exemplified embodiment, the retaining element 200 comprises a body 201 having a first surface 202 and a second surface 203 opposite the first surface 202, a first pin 204 extending from the first surface 202, and a second pin 205 extending from the first surface 202. The first and second pins 204, 205 extend from the first surface 202 of the body 201 in a spaced apart manner. The first and second pins 204, 205 taper to a point at their distal ends that is spaced furthest from the body 201 to enable the first and second pins 204, 205 to penetrate the apertures 140, 141 of the support structure 100 as described herein.

In the exemplified embodiment, the body 201 of the retaining element 200 is circular in shape. Of course, the invention is not to be so limited and the body 201 may have any other shape as desired. In the exemplified embodiment, the body 201 of the retaining element 200 may have a diameter of between approximately 6 inches and 10 inches, more specifically between 7 inches and 9 inches, and still more specifically between 8.5 inches and 9.5 inches. Thus, because the body 201 of the retaining element 200 is reasonably large, when all of the components are attached the body 201 extends down along the posts 120, 130 for a fairly significant length to securely retain a floral arrangement therein as described herein below.

In other embodiments, the retaining element 200 may comprise two separate bodies, each having one or more pins extending therefrom in other embodiments. In the exemplified embodiment, the body 201 of the retaining element 200 may be formed from plastic while the first and second pins 204, 205 are formed from metal. The first and second pins 204, 205 may be formed as a part of a unitary staple that is embedded within the body 201. Alternatively, the first and second pins 204, 205 may be separate elements that are coupled to and extend from the body 201. Thus, variations to the manner of manufacturing the retaining element 200 are possible so long as it includes the body 201 and the first and second pins 204, 205 in the exemplified embodiment. In other embodiments, the first and second pins 204, 205 may be omitted and the body 201 may include first and second apertures instead. The purpose of this would be to facilitate coupling of the retaining element 200 to the support element 100 if the support element 100 has pins instead of apertures.

In the exemplified embodiment, the retaining element 200 is detachably coupled to the support element 100 by inserting the first and second pins 204, 205 of the retaining element 200 through the first and second apertures 140, 141 of the support element 100 until the first and second pins 204, 205 nest within the first and second passageways 142, 143, respectively. Specifically, the first pin 204 extends through the first aperture 140 and into the first passageway 142 and the second pin 205 extends through the second aperture 141 and into the second passageway 143 as the support element 100 and the retaining element 200 are translated towards one another. The retaining element 200 can be repetitively detached from and reattached to the support element 100 as many times as may be desired or until the first and second passageways 142, 143 become stretched out over time such that the first and second pins 204, 205 no longer fit snugly therein.

Referring to FIGS. 4-10, the manner in which the attachment device 1000 is coupled to a floral arrangement 150 and used to couple the floral arrangement 150 to an article such as a jacket lapel will be described. The floral arrangement 150 may comprise at least one floral element 151 and a stem 152. The stem 152 extends along a longitudinal axis A-A. As discussed above, the floral arrangement 150 may be a boutonniere, which may comprise a single floral element or multiple floral elements. When multiple floral elements are used, each one is typically attached to its own stem. Thus, in such embodiments the stems of the floral elements may be coupled together such as by using floral tape, other types of adhesive tape, or the like to give the floral arrangement 150 a common stem 152 that is inserted into the receiving cavity 105 of the support element 100 to couple the floral arrangement 150 to the support element 100.

Figure 4:
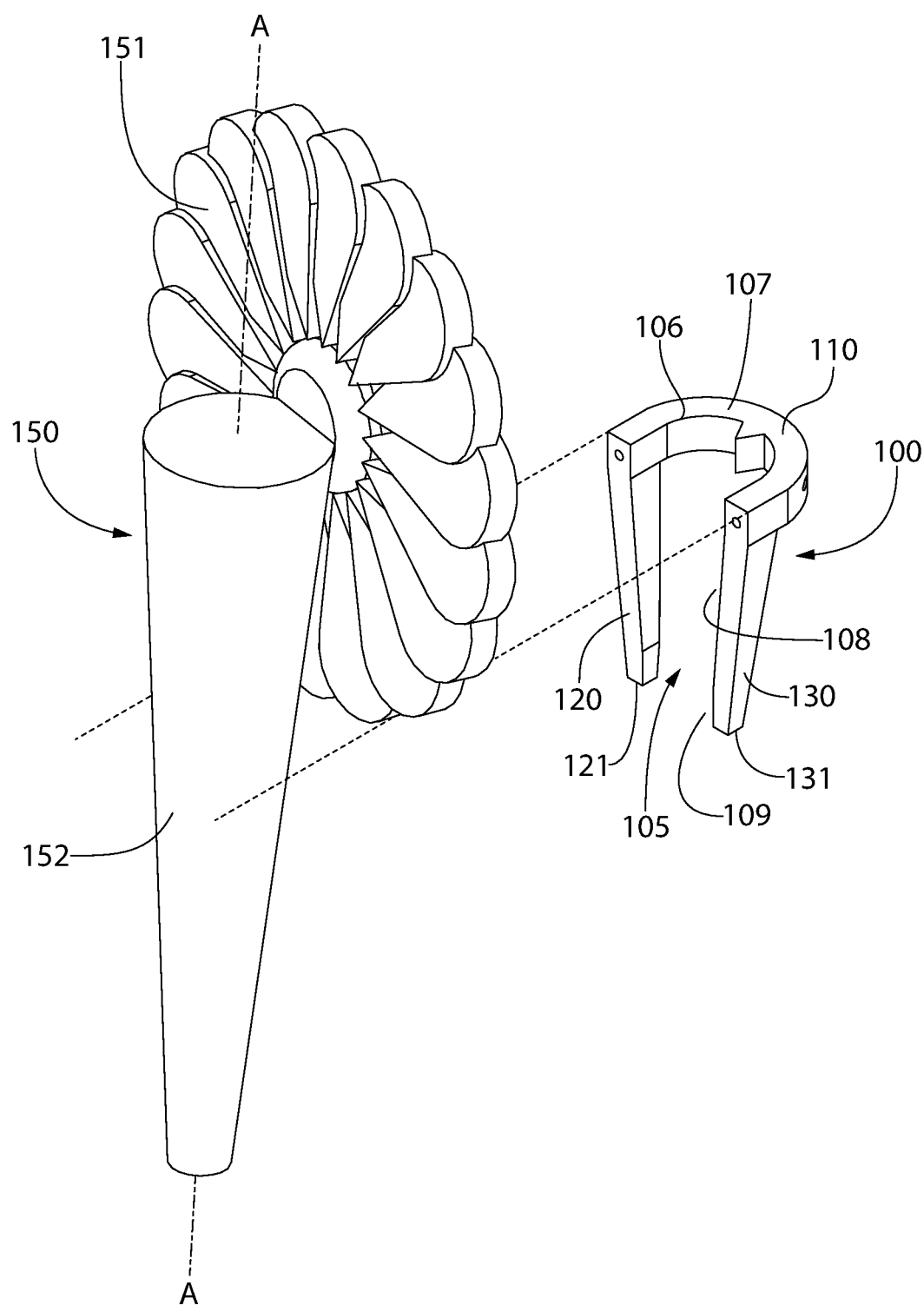
FIG. 4 is a perspective view of the support element of the attachment device of FIG. 1A adjacent to a floral arrangement in preparation for being coupled together.
Figure 5:
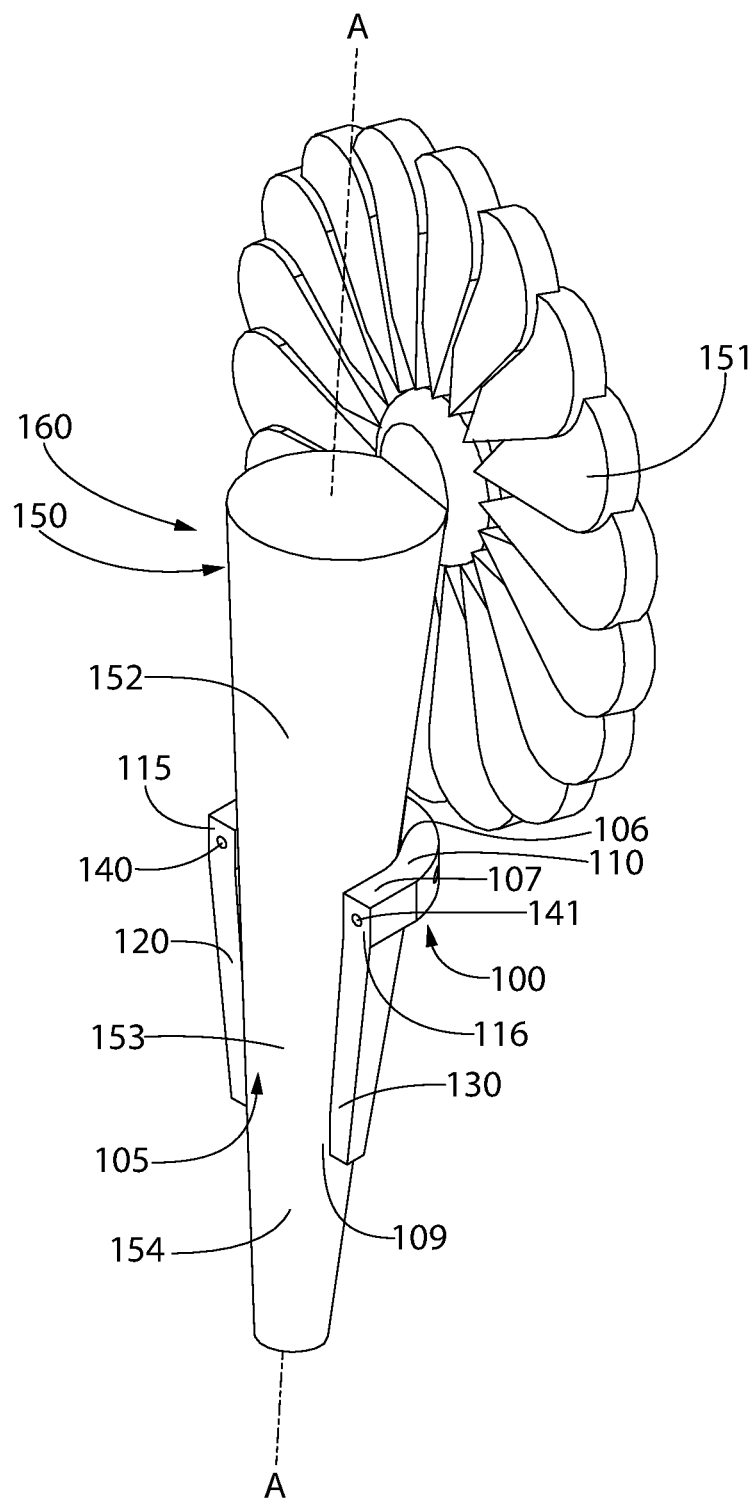
FIG. 5 is a perspective view illustrating a stem of the floral arrangement positioned within a receiving cavity of the support element of the attachment device of FIG. 1A.

FIG. 4 illustrates the support element 100 and the floral arrangement 150 adjacent to one another with the dashed lines illustrating the manner in which the support element 100 and/or the floral arrangement 150 need to be moved to begin the process of coupling the floral arrangement 150 to the support element 100. The support element 100 and the stem 152 of the floral arrangement 150 are moved towards one another until a first portion 153 of the stem 152 is located within the receiving cavity 105 of the support element 100, as illustrated in FIG. 5. The stem 152 may enter into the receiving cavity 105 through an open top end 106 of the receiving cavity 105 located at a top surface 107 of the support element 100 or through a side opening 108 of the receiving cavity 105 located between the first and second posts 120, 130 of the support element 100. Thus, the manner of inserting the floral arrangement 150 into the receiving cavity 105 illustrated in FIG. 4 is just one way in which this can be achieved.

The receiving cavity 105 comprises the open top end 106 aligned with the top surface 107 of the support element 100 and an open bottom end 109 aligned with the distal ends 121, 131 of the first and second posts 120, 130. When the first portion 153 of the stem 152 of the floral arrangement 150 is located within the receiving cavity 105 of the support element 100, a second portion 154 of the stem 152 protrudes from the open bottom end 109 of the receiving cavity 105 and the at least one floral element 151 protrudes from the open top end 106 of the receiving cavity 105. The support element 100 may be positioned at varying heights along the length of the stem 152, but in preferred embodiments the support element 100 is positioned near the top of the stem 152 where the floral element(s) 151 protrude because this is the heaviest portion of the floral arrangement 150 and requires the most support.

Referring to FIG. 5, the first portion 153 of the stem 152 is positioned within the receiving cavity 105 of the support element 100 so that the first and second posts 120, 130 are located on opposite sides of the stem 152 (and opposite sides of the longitudinal axis A-A of the stem 152) while the rib member 110 circumferentially surrounds a portion of the stem 152. More specifically, the first and second posts 120, 130 are elongated along the first portion 153 of the stem 152 in a direction of the longitudinal axis A-A of the stem 152. The rib member 110 wraps around a portion of the stem 152, which thereby creates the receiving cavity 105. The arcuate shape of the rib member 110 in the exemplified embodiment may be desirable to ensure a close-fit between the inner surface 113 of the rib member 110 and the outer surface of the stem 152 of the floral arrangement 150.

The first and second posts 120, 130 are flexible as described herein and thus they can be pushed inwardly towards one another until they contact the stem 151 to ensure a tight coupling therebetween. Furthermore, the rib member 110 can be flexed by pressing on the outer surface 114 of the rib member 110 near the first and second ends 115, 116 of the rib member 110. The rib member 110 preferably surrounds a front portion of the stem 152 such that the first and second ends 115, 116 of the rib member 110 are aligned with a rear portion of the stem 152. The front portion of the stem 152 is the part that faces out away from the article for viewing whereas the rear portion of the stem 152 is the part that faces the article and is not exposed for viewing. The inner surface 113 of the rib member 110 and the first side surfaces 123, 133 of the first and second posts 120, 130 are adjacent to, and may be in surface contact with, an outer surface of the stem 152.

Figure 6:
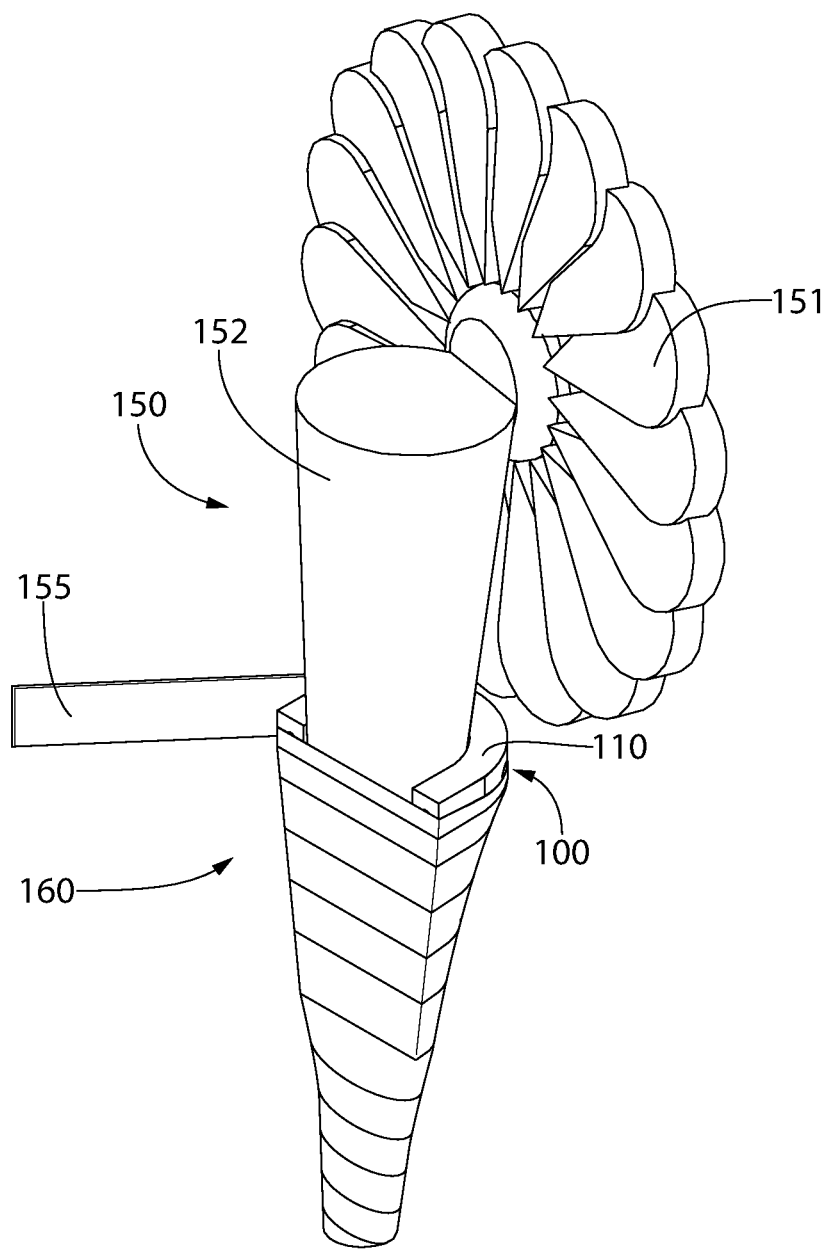
FIG. 6 is a perspective view illustrating a wrapping element being wrapped around the support element and the stem of the floral arrangement of FIG. 5 to couple the support element to the floral arrangement.

Referring to FIG. 6, after the first portion 153 of the stem 152 is positioned within the receiving cavity 105 of the support element 100, a wrap element 155 is wrapped around the support element 100 and the first portion 153 of the stem 152. The purpose of the wrap element 155 is to couple the floral arrangement 150 to the support element 100 and also to hide the support element 100 from view. As seen in FIG. 5, because the support element 100 wraps around a front portion of the stem 152, the support element 100 would be visible when the apparatus is coupled to an article of clothing. Thus, it may be important in certain embodiments to cover or otherwise hide the support element 100 from view because its sight may be unseemly and may detract from the beauty of the floral arrangement 150. In that regard, it is preferable that the wrap element 155 wrap around the entire support element 100 until no portion of the support element 100 remains exposed (shown in FIG. 7)

In FIG. 6, the wrap element 155 is illustrated wrapping around the support element 100 and the first and second portions 153, 154 of the stem 152. However, the invention is not to be so limited in all embodiments and the wrap element 155 may only wrap around the support element 100 and the first portion 153 of the stem 152 while leaving the second portion 154 of the stem 152 (or portions thereof) uncovered by the wrap element 155. This may be dependent upon aesthetics, holding capabilities of the wrapping element, or the like. The wrap element 155 may be any type of adhesive tape including those that have a sticky substance on one or more surfaces and those that do not include any sticky surfaces but rather are formed from a material that adheres to itself without using sticky adhesives (i.e., bondage tape). Alternatively, the wrap element 155 could be string, wire, rope, twine, or any other material that may facilitate coupling of the floral arrangement 150 to the support element 100.

It should be appreciated that when the floral arrangement 150 is located within the receiving cavity 105 of the support element 100, the combination of the floral arrangement 150 and the support element 100 may be referred to herein as a floral apparatus 160. The floral apparatus 160 comprises at least the support element 100 and the floral arrangement 150, and may also comprise the retaining element 130 and the wrap element 155.

Figure 7:
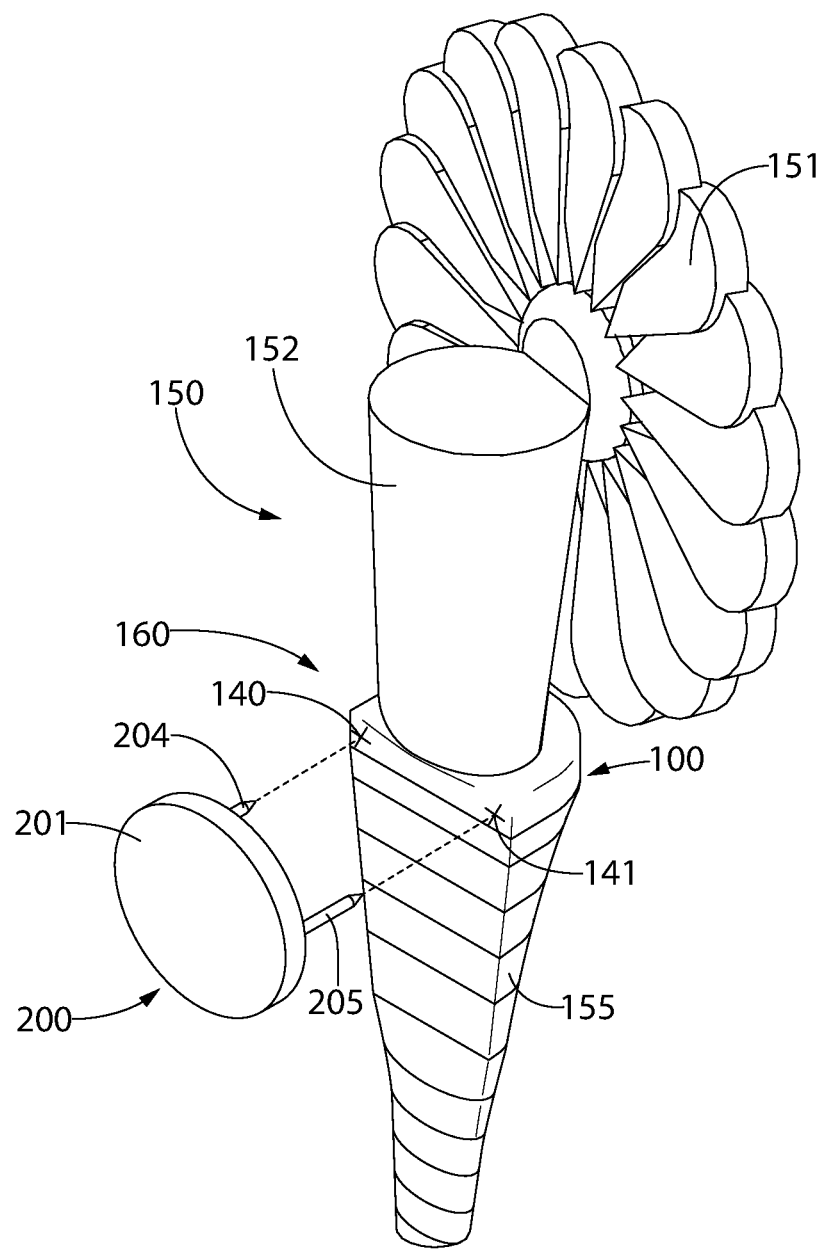
FIG. 7 is a perspective view illustrating the retaining element of FIG. 1A adjacent to the wrapped floral arrangement and support element in preparation for coupling the retaining element to the support element.

Referring to FIG. 7, once the wrap element 155 is secured around the support element 100 and the first portion 153 of the stem 152 of the floral arrangement 150, the floral apparatus 160 is ready for coupling to an article (i.e., an article of clothing such as the lapel of a jacket, a curtain, a textile, or the like). Thus, FIG. 7 illustrates the first and second pins 204, 205 of the retaining element 200 aligned with the first and second apertures 140, 141 of the support element 100. At this step in the process, the first and second apertures 140, 141 are covered by the wrap element 155 so they are not visually exposed. However, the first and second pins 204, 205 can easily penetrate the wrap element 155 and enter into the first and second apertures 140, 141 and the first and second passageways 142, 143. Dashed lines are provided in FIG. 7 to represent the manner in which the retaining element 200 may be moved to couple it to the support element 100.

The floral apparatus 160 may be provided to a customer from a florist in the form shown in FIG. 7 except with the retaining element 200 coupled to the support element 100. Thus, rather than simply providing a customer with a floral arrangement 150 that requires a separate straight pin to secure the floral arrangement 150 to an article, the florist can provide the customer with a finished product that the customer can readily and easily attach to his or her own article of clothing even while the customer is wearing the article of clothing. Using conventional techniques, the clothing-wearer almost always required the assistance of a second person in order to properly couple the floral arrangement 150 to his or her formal wear. The floral apparatus 160 takes away the difficulty in coupling the floral arrangement 150 to formal wear and makes it so that an individual can do it by him or herself. Upon being presented with the floral apparatus 160, the customer/user will simply detach the retaining element 200 from the support element 100, place the pins 204, 205 of the retaining element 200 through the article to which it is desired to attach the floral arrangement 150, and then re-secure the support element 100 to the retaining element 200. This process is described in more detail below with reference to FIGS. 8-10.

Figure 8:
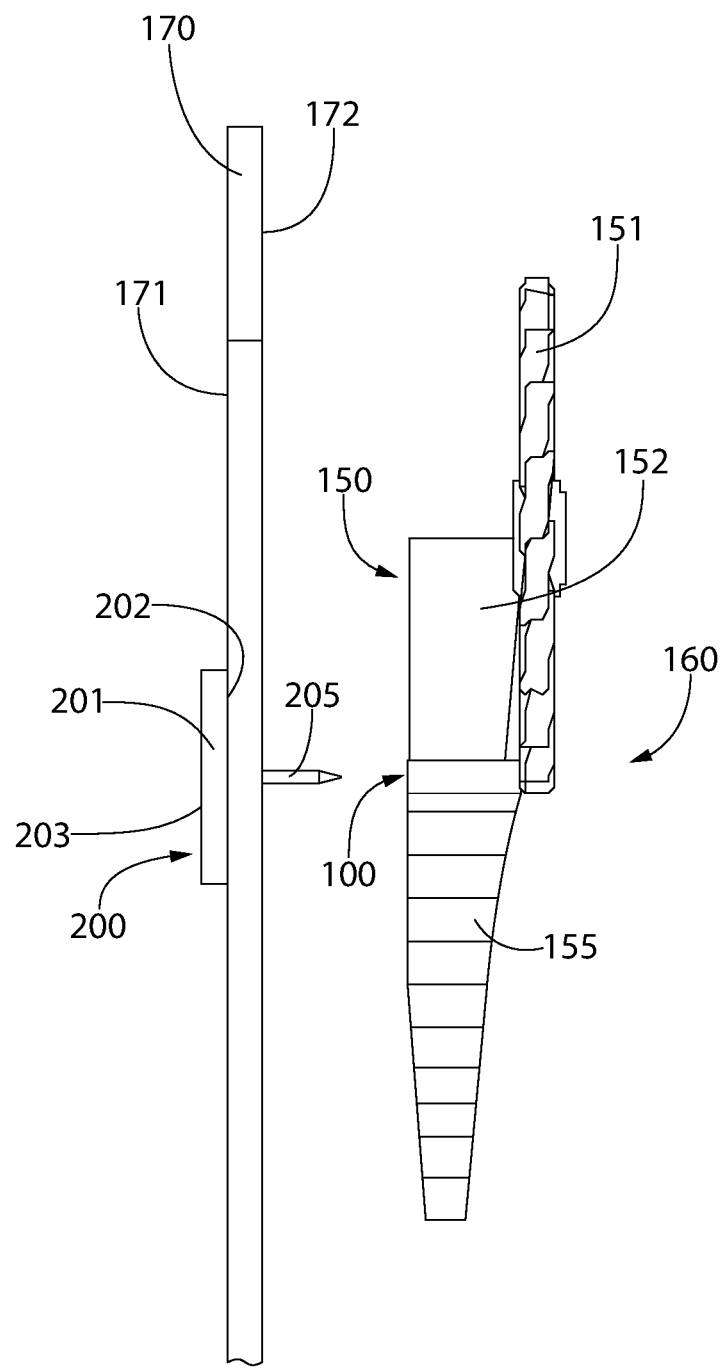
FIG. 8 is a side view illustrating pins of the retaining element extending through an article with the wrapped floral arrangement and support element adjacent thereto in preparation for coupling the support element to the retaining element.
Figure 9:
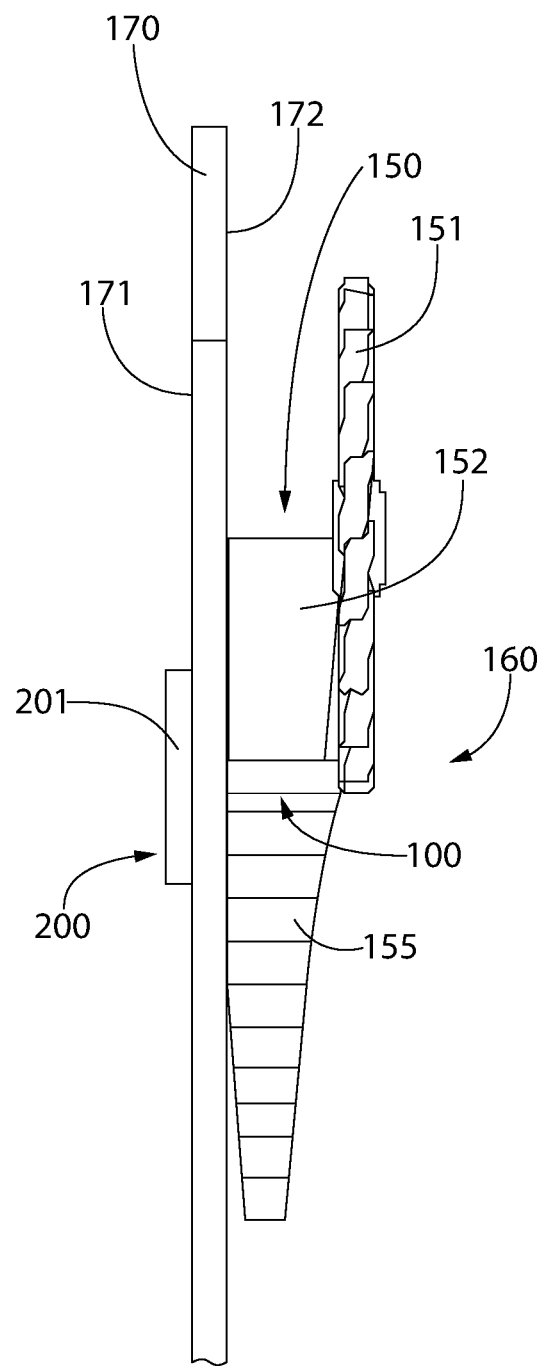
FIG. 9 is the side view of FIG. 8 with the retaining element coupled to the support element, thereby coupling the floral apparatus to the article.
Figure 10:
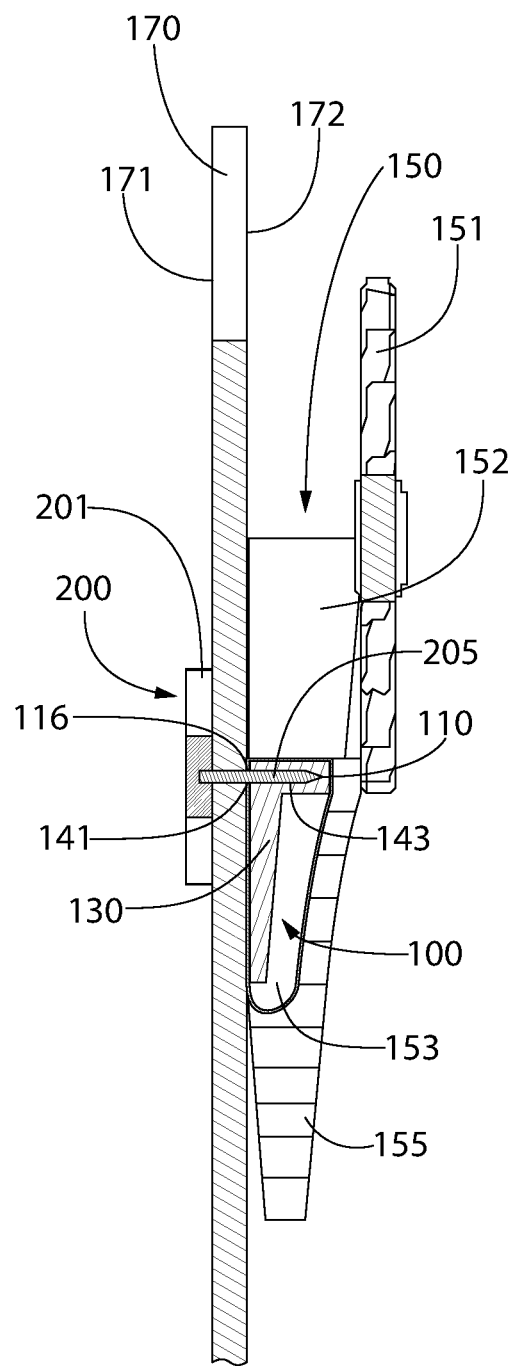
FIG. 10 is a partial sectional and partial cut-away view of FIG. 9.

Referring to FIGS. 8-10, coupling of the floral apparatus 160 to an article 170 will be described. The article 170 may be the lapel of a jacket, a different portion of a jacket, a different article of clothing, or any other type of textile upon which it may be desired to attach the floral apparatus 160. The article 170 has a first surface 171 and an opposite second surface 172. First, the retaining element 200 is placed on a first side of the article 170 adjacent the first surface 171. Next, the pins 204, 205 of the retaining element 200 are pressed through the article 170 so that the body 201 of the retaining element 200 remains on the first side of the article 170 and the pins 204, 205 of the retaining element 200 extend through the article 170 and protrude from the second surface 172 of the article 170. Next, the support element 100 with the floral arrangement 150 coupled thereto via the wrap element 155 is positioned on a second side of the article 170 adjacent the second surface 172.

The support element 100 with the floral arrangement 150 coupled thereto is moved towards the article 170 until the first pin 204 penetrates the wrap element 155 and extends through the first aperture 140 and into the first passageway 142 and simultaneously the second pin 205 penetrates the wrap element 155 and extends through the second aperture 141 and into the second passageway 143, thereby detachably coupling the retaining element 200 to the support structure 100. Because the floral arrangement 150 is coupled to the support structure 100, this action also couples the floral arrangement 150 to the article 170. The retaining element 200 and the support structure 100 can be repetitively attached to and detached from one another as desired.

FIG. 10 illustrates a partial, schematic, cross-sectional view of the floral apparatus 160 coupled to the article 170. This view illustrates the second pin 205 of the retaining element 200 extending through the second aperture 141 in the second end 116 of the support element 100 and nesting within the second passageway 143.

Thus, the attachment device 1000 can be used to properly couple the floral arrangement 150 to the article 170 easily and in an aesthetically pleasing manner. Furthermore, using the attachment device 1000, the floral arrangement 150 remains coupled to the article 170 regardless of the amount of shaking, pulling, and the like that occurs. Thus, a user can dance, run, or the like without fear that the floral arrangement 150 is going to become detached form the article 170. When coupled to the article 170, the stem 152 of the floral arrangement 150 is located between the support element 100 and the second surface 172 of the article 170. Furthermore, the article 170 is located between the support element 100 and the body 201 of the retaining element 200.

Referring to FIGS. 11A-11D, a support element 300 of an attachment device is illustrated in accordance with another embodiment of the present invention. The support element 300 is identical to the support element 100 except for the differences described herein below. Thus, features of the support element 300 that are similar or identical to features of the support element 100 that have already been described above will not be described in great detail herein, it being understood that the description of the support element 100 above is applicable. Furthermore, in embodiments various combinations of features of the support element 300 and features of the support element 100 are possible.

Specifically, the support element 300 comprises a first rib member 310, a first post 320 extending from a bottom surface 318 of the first rib member 310, and a second post 330 extending from the bottom surface 318 of the first rib member 310. Differently from the previously described embodiment, in this embodiment the support element 300 also comprises a second rib member 340. Thus, the first and second posts 320, 330 do not terminate in free distal ends in this embodiment, but rather first ends of the first and second posts 320, 330 are coupled to the first rib member 310 and second ends of the first and second posts 320, 330 are coupled to the second rib member 340. Each of the first and second rib members 310, 340 is arcuate in shape, although the invention is not to be so limited and alternative shapes for the first and second rib members 310, 340 are possible, such as those described above with regard to the rib member 110. The first and second rib members 310, 340 and the first and second posts 320, 330 collectively define a receiving cavity 305 that is configured to receive a stem of a floral arrangement.

In this embodiment, the first and second posts 320, 330 are spaced apart by a constant distance. Thus, the distance between the first and second posts 320, 330 does not decrease with distance from the first rib member 310 as with the previous embodiment. This feature is applicable to the support element 100 described previously as well.

In this embodiment, rather than having apertures in the support member that receive pins of a retaining element, the support member 300 comprises a plurality of pins 350, 351, 352, 353 extending therefrom. More specifically, the first rib member 310 extends from a first end 311 to a second end 312 and the second rib member 340 extends from a first end 341 to a second end 342. The plurality of pins comprises a first pin 350 protruding from the first end 311 of the first rib member 310, a second pin 351 protruding from the second end 312 of the first rib member 310, a third pin 352 protruding from the first end 341 of the second rib member 340, and a fourth pin 353 protruding from the second end 342 of the second rib member 340. Of course, one or more of the first, second, third, and fourth pins 350-353 could be omitted such that only the first and second pins 350, 351 are included, or only the first and third pins 350, 352 are included, or the like.

The support element 300 also comprises a first protuberance 313 protruding from an inner surface 314 of the first rib member 310 and a second protuberance 343 protruding from an inner surface 344 of the second rib member 340. In this embodiment, each of the first and second protuberances 313, 343 are pins that are similar to the plurality of pins 350-353 described above (which are similar in size, shape, structure, and material to the pins 204, 205 of the retaining element 200). The first and second protuberances 313, 343 are located centrally along the first and second rib members 310, 340, respectively. When the stem 152 of the floral arrangement 150 is positioned within the receiving cavity 305, the first and second protuberances 313, 343 may penetrate the stem 152, thereby securing the support element 300 to the floral arrangement 150. This may be done instead of or in addition to a wrap element as described previously. Of course, one or both of the first and second protuberances 313, 343 may be omitted in other embodiments.

Figure 11E:
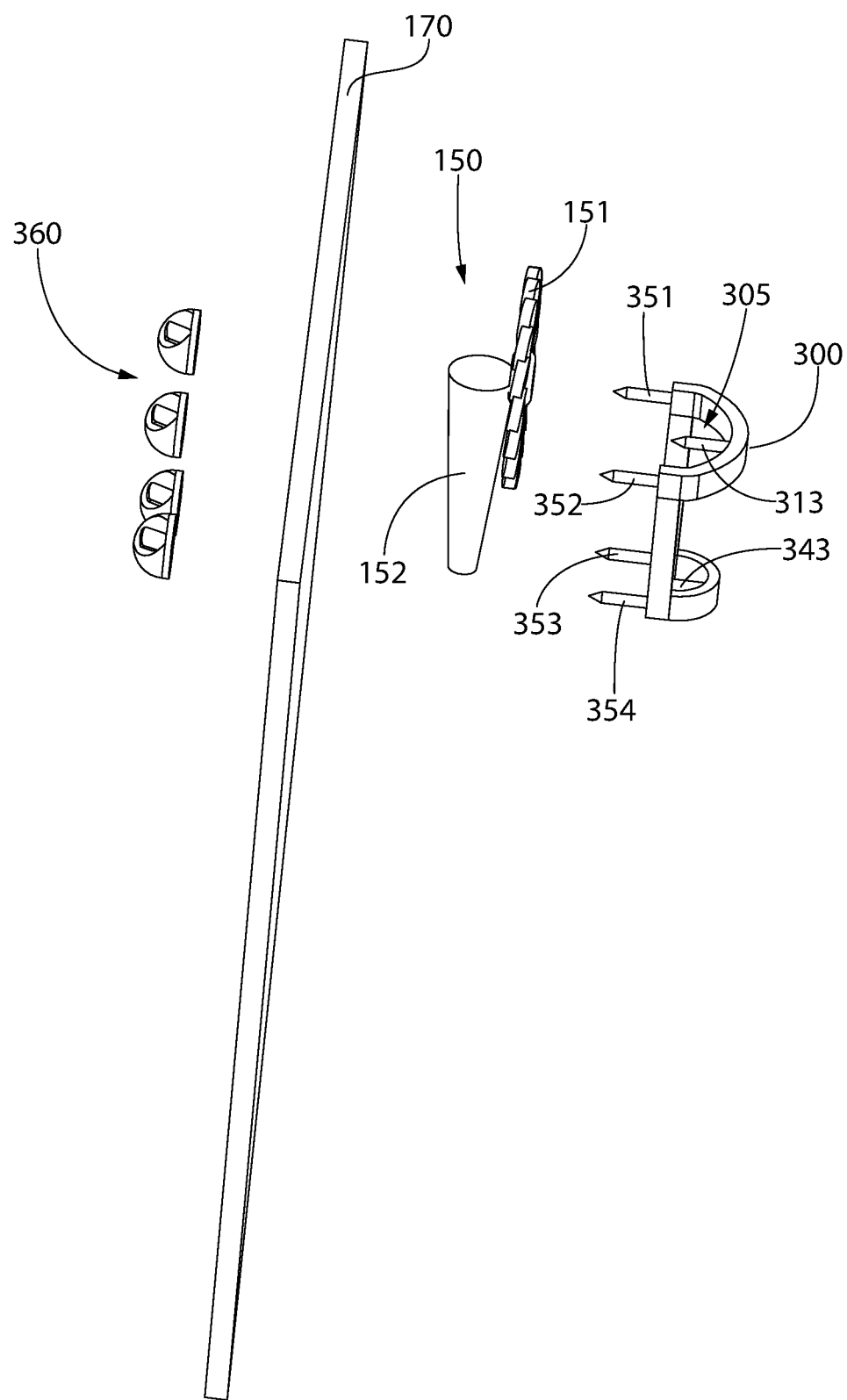
FIG. 11E is a perspective view illustrating the support element of FIG. 11A, a floral arrangement, and a retaining element in preparation for being coupled to an article.

FIG. 11E illustrates the support element 300 in preparation for being used to couple the floral arrangement 150 to the article 170. Specifically, the support element 300 and the floral arrangement 150 are positioned on one side of the article 170 and a retaining element 360 is positioned on the opposite side of the article. In this embodiment, the retaining element 360 comprises a plurality of distinct fasteners (i.e., military post fasteners or the like), each of which may be coupled to one of the pins 350-353. Of course, in other embodiments the retaining element 360 may be a unitary component having distinct openings or apertures therein, each opening or aperture configured to receive one of the pins 350-353 for coupling the support element 300 to the retaining element 360.

To couple the floral arrangement 150 to the article 170, the stem 152 of the floral arrangement 150 is placed within the receiving cavity 305 of the support element 300. The pins 313, 343 may penetrate the stem 152 to couple the support element 300 to the floral arrangement 150. Additionally, or alternatively, the support element 300 and at least a portion of the stem that is located in the receiving cavity 305 may be wrapped with a wrap element (not shown, but see FIG. 6 for an example of this). Next, the pins 350-353 of the support element 300 are pressed into and through the article 170 so that the floral arrangement 150 is sandwiched between the support element 300 and the article 170. Finally, the retaining element 360 is coupled to the support element 300 (via engagement between the pins 350-353 of the support element 300 and the apertures of the retaining element 360).

Referring to FIGS. 12A-12D, a support element 400 is illustrated in accordance with yet another embodiment of the present invention. The support element 400 is essentially a combination of the support element 100 and the support element 300. Specifically, the support element 400 comprises a first rib element 410, a second rib element 440, and first and second posts 420, 430 extending between the first and second rib elements 410, 440 (similar to the support element 300). The first and second posts 420, 430 are spaced apart from one another with a distance that decreases from the first rib element 410 to the second rib element 440 (similar to the support element 100). The support element 400 comprises pins 450-453 and protuberances 413, 443 similar to that described above for the support element 300.

Figure 12A:
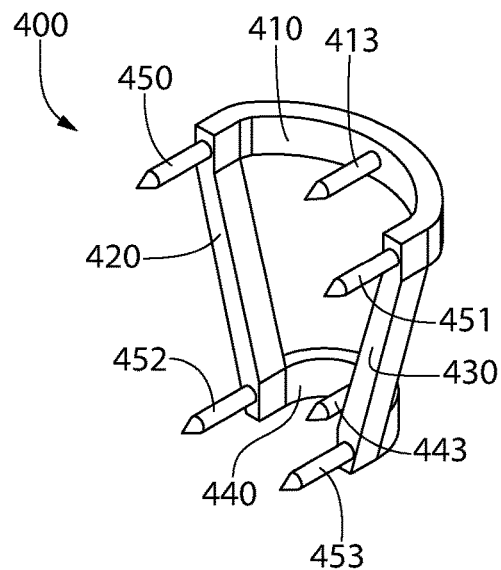
FIG. 12A is a perspective view of a support element of an attachment device for coupling a floral arrangement to an article in accordance with yet another embodiment of the present invention.
Figure 12B:
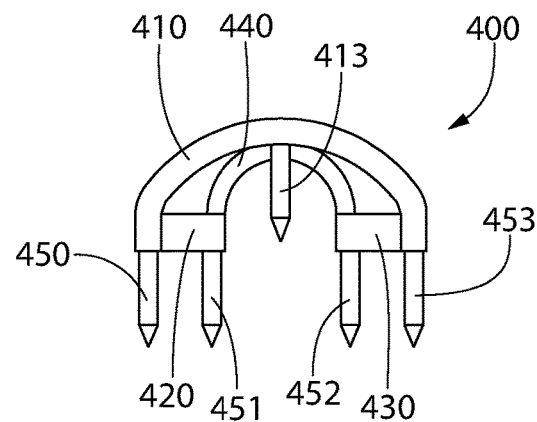
FIG. 12B is a top view of the support element of FIG. 12A.
Figure 12C:
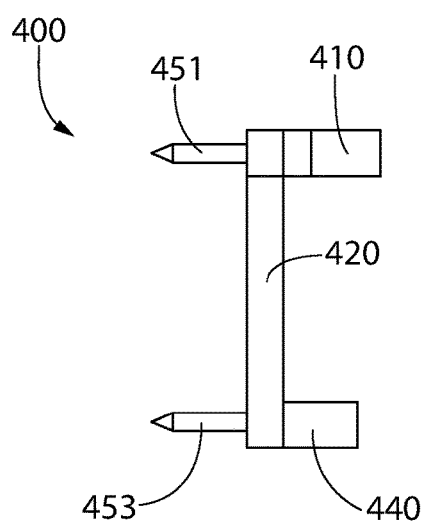
FIG. 12C is a side view of the support element of FIG. 12A.
Figure 12D:
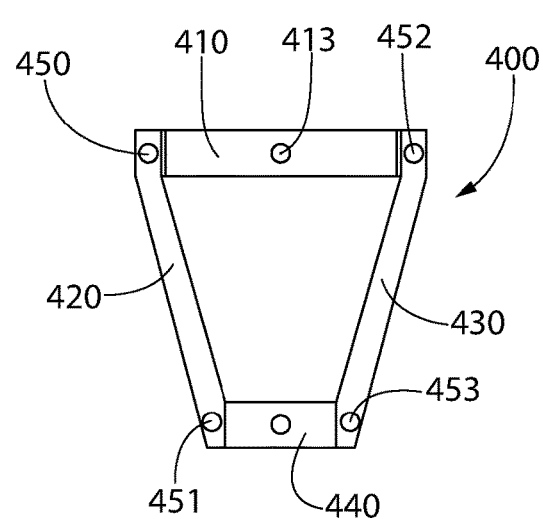
FIG. 12D is a front view of the support element of FIG. 12A.
Figure 12E:
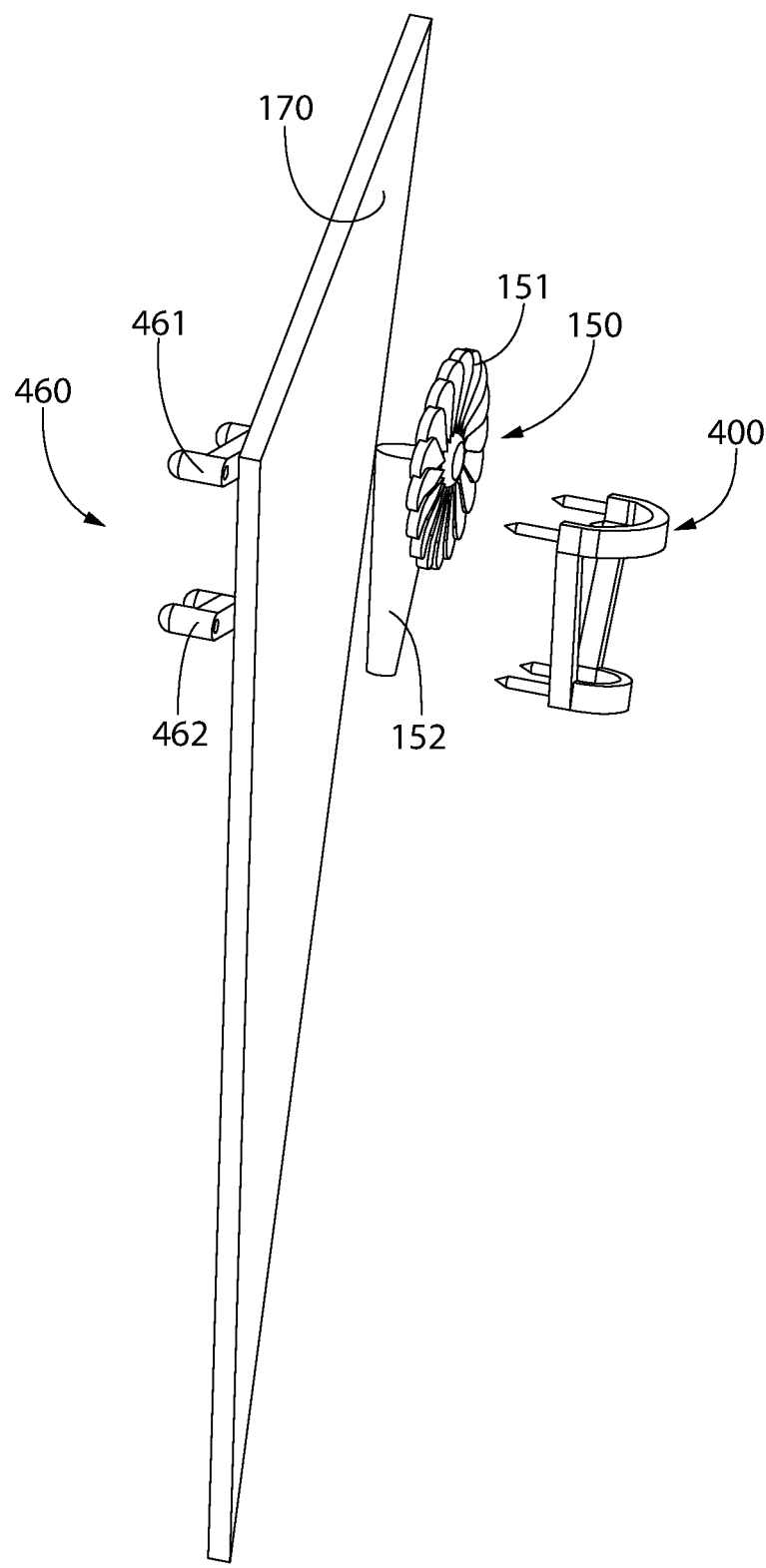
FIG. 12E is a perspective view illustrating the support element of FIG. 12A, a floral arrangement, and a retaining element in preparation for being coupled to an article.

FIG. 12E illustrates the support element 400, a retaining element 460, and the floral arrangement 150 in preparation for coupling to an article 170. In this embodiment the retaining element 460 comprises a first component 461 and a second component 462, each of which comprises two apertures for receiving two of the pins 450-453. Of course, the retaining element 460 could be a single, unitary component in some embodiments or it could comprise four or more separate elements each configured for coupling to a single one of the pins 450-453.

FIGS. 13A-13E illustrate a support element 500 in accordance with still another embodiment of the present invention. The support element 500 is identical to the support element 400 except that it includes an additional cover member 580. Specifically, the support element 500 comprises a first rib member 510, a second rib member 540, and first and second posts 520, 530 extending between the first and second rib members 510, 540. The cover member 580 extends between the first and second rib members 510, 540 and between the first and second posts 520, 530. The cover member 580 is located along the portion of the support element 500 that is aligned with the front of the floral arrangement. Thus, the cover member 580 is exposed when the support element 500 is used to couple the floral arrangement to an article (i.e., a lapel) unless the cover member 580 is covered by a wrap element as described herein above.

It may be desirable in some embodiments to leave the cover member uncovered by any wrap element. In fact, in this embodiment the wrap element may not be needed to couple the floral arrangement to the support element 500 due to the protuberances which may penetrate the stem to secure the support element 300 to the floral arrangement, as described above with reference to FIGS. 11A-11D. Thus, the cover member 580 may comprise an ornamental design feature thereon to create a desired aesthetic. For example, the cover member 580 may comprise design features such as logos from a sports team, corporate logos, an illustration or other artwork, or the like. The cover member 580 may be desirable for licensing the product to a variety of companies along with making it a customizable keepsake for proms and weddings. In other embodiments, the cover member 580 may not be detachable but rather the support element 500 may be a monolithic integral structure. However, the cover member 580 may still have some design indicia thereon to increase the aesthetic appeal of the support element 500. A cover member or design indicia may be added to any of the embodiments described herein.

Figure 13E:
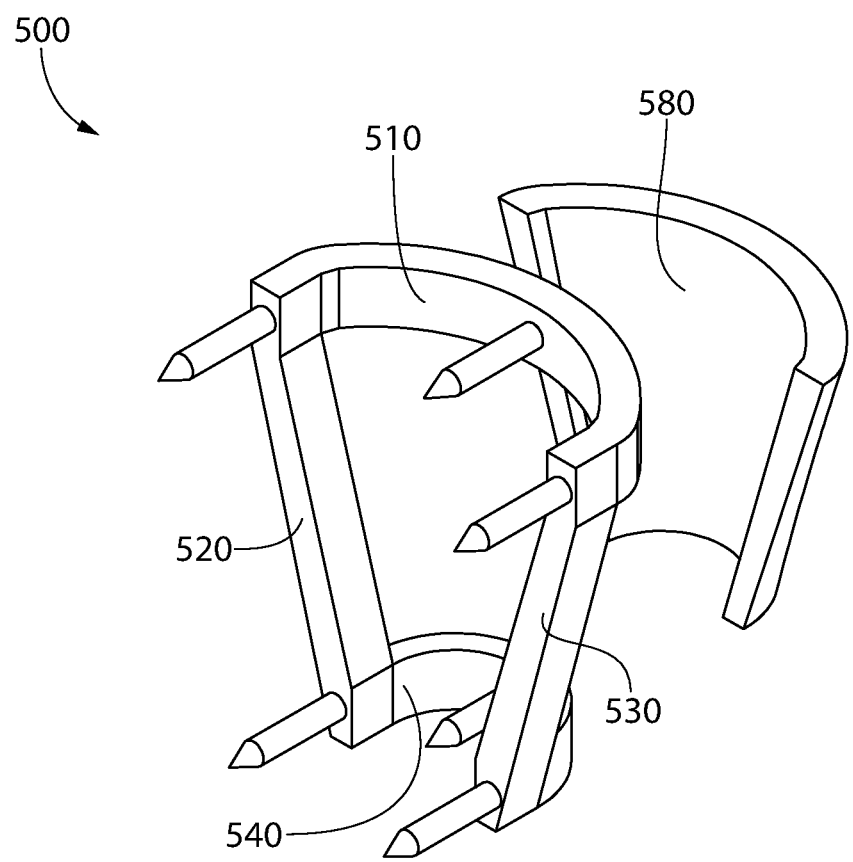
FIG. 13E is a perspective view illustrating the cover member of FIG. 13A with a cover member exploded.
Figure 14A:
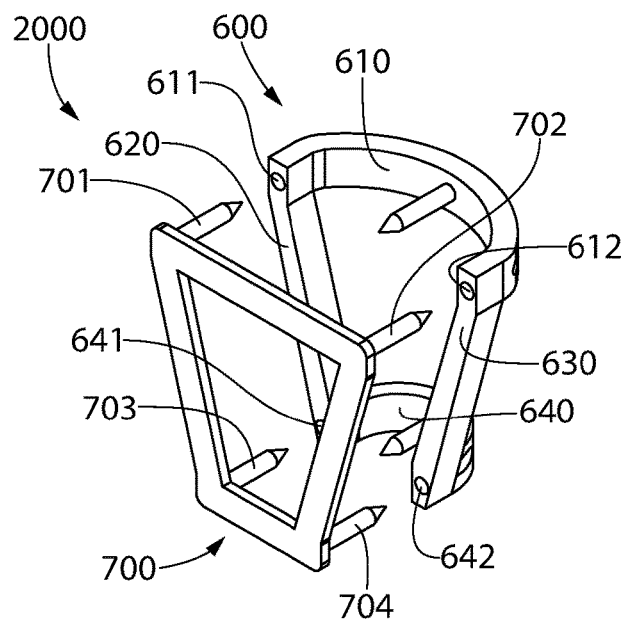
FIG. 14A is a perspective view of an attachment device for coupling a floral arrangement to an article in accordance with a further embodiment of the present invention.
Figure 14B:
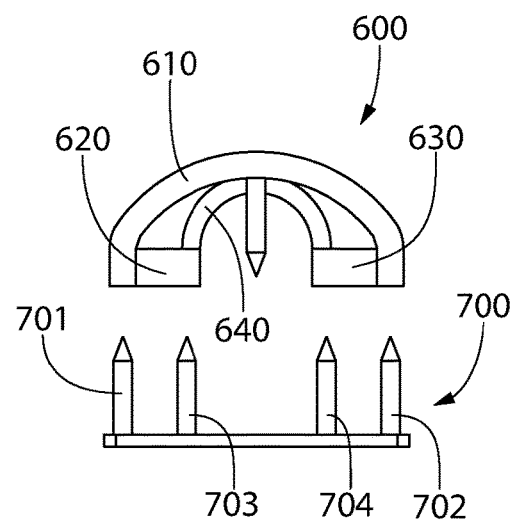
FIG. 14B is a top view of the attachment device of FIG. 14A.
Figure 14C:
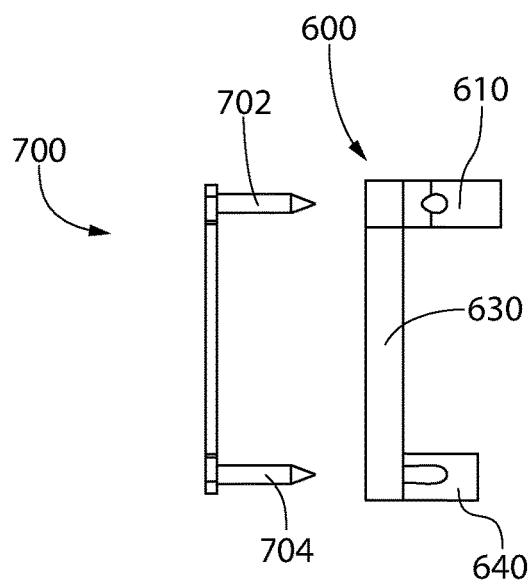
FIG. 14C is a side view of the attachment device of FIG. 14A.
Figure 14D:
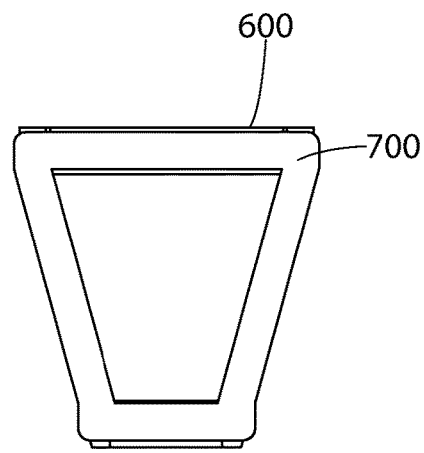
FIG. 14D is a front view of the attachment device of FIG. 14A.

As shown in FIG. 13E, the cover member 580 may be detachably coupled to the remainder of the support element 500. This would enable a user to swap out one cover member 580 for another depending on the event that it is being worn to. Specifically, for a prom a user might want to have a logo of the school mascot on the cover member 580, whereas for a work event the user might want to have a company logo or some other design on the cover member 580. Thus, the cover member 580 and the rib members 510, 540 and posts 520, 530 may be designed with mating mechanical features to enable the cover member 580 to be repeatedly attached to and detached from the remainder of the support element 500.

Referring now to FIGS. 14A-14D, another embodiment of an attachment device 2000 comprising a support element 600 and a retaining element 700 is illustrated. This embodiment is the result of combining features of the attachment device 1000 and the support element 400. Specifically, the support element 600 is similar to the support element 100 except that it includes a second rib member 640 in addition to the first rib member 610 and the first and second posts 620, 630. Furthermore, in this embodiment there are first and second apertures 611, 612 in the first and second ends of the first rib member 610 and third and fourth apertures 641, 642 in the first and second ends of the second rib member 640. The retaining element 700 comprises first, second, third, and fourth pins 701, 702, 703, 704 that extend through the first, second, third, and fourth apertures 611, 612, 641, 642, respectively, to detachably couple the retaining element 700 to the support element 600.

FIGS. 15A-15D illustrate another embodiment of a support element 800 in accordance with the present invention. The support element 800 has a similar shape to the support element 400 except it replaces the pins with first and second pivotable pin structures 810, 811. In this embodiment, there is no need for a retaining element because the first and second pivotable pin structures 810 are configured to secure the support element 800 to the lapel. Each of the first and second pivotable pin structures 810, 811 is configured to pivot relative to the body of the support element 800 to facilitate coupling the support element 800 to an article (via the pivotable pin structures 810, 811). The support structure 800 also includes first and second hook members 820, 821 for holding the pins of the first and second pivotable pin structures 810, 811. In use, the pins of the pivotable pin structures 810, 811 are inserted into and through an article from a front side of the article to a rear side of the article, and then back through the article from the rear side of the article to the front side of the article. Then, the pivotable pin structures 810, 811 are inserted into the hook members 820, 821 to secure the support member 800 to the article.

Figure 16A:
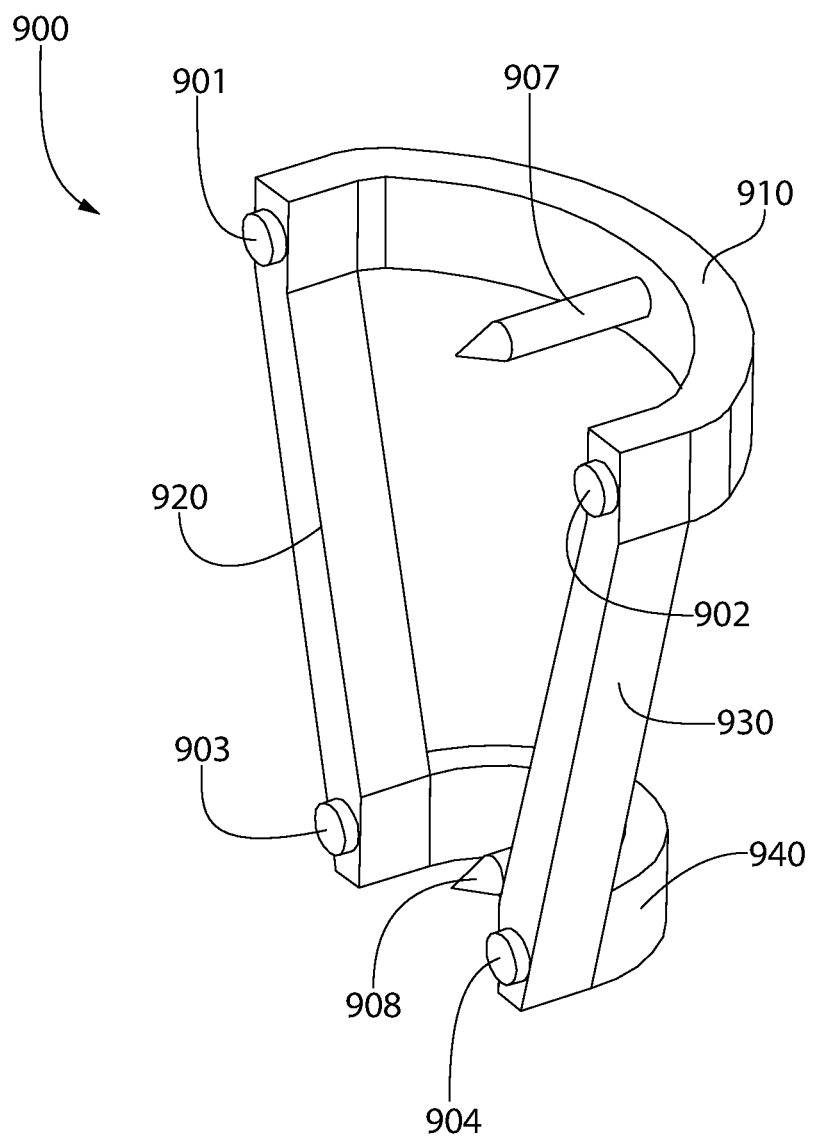
FIG. 16A is a perspective view of a support element of an attachment device for coupling a floral arrangement to an article in accordance with another embodiment of the present invention.

FIG. 16A illustrates still another embodiment of a support element 900 in accordance with the present invention. The support element 900 is similar in shape to the previously described support element 400, except instead of pins it comprises magnets 901, 902, 903, 904 to couple the support element 400 to an article. Thus, the support element 900 comprises first and second rib members 910, 940 and first and second posts 920, 930 extending between the first and second rib members 910, 940. The first and second magnets 901, 902 are located on the opposite ends of the first rib member 910 and the third and fourth magnets 903, 904 are located on the opposite ends of the second rib member 940. The support element is illustrated with pin-like protuberances 907 that are intended to penetrate the stem of the flower as shown and described with reference to the previous embodiments. The magnets 901-904 may protrude from the ends of the first and second rib members 910, 940, be flush with the ends of the first and second rib members 910, 940, or be recessed relative to the ends of the first and second rib members 910, 940. Alternatively, the ends of the first and second rib members 910, 940 may be formed from a magnetic material rather than having separate magnetic elements coupled thereto.

Figure 16B:
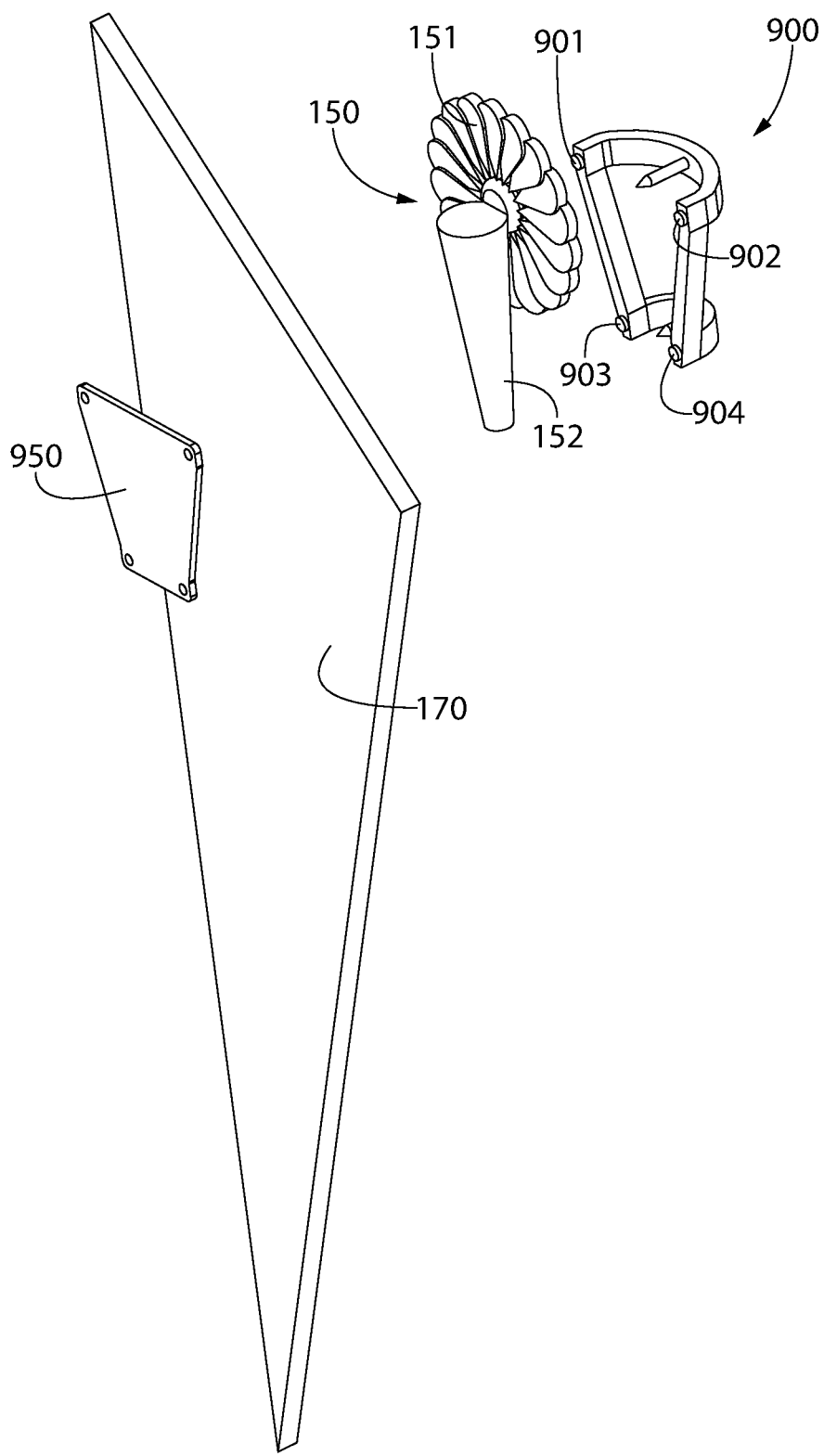
FIG. 16B is a perspective view illustrating the support element of FIG. 16A along with a floral arrangement and a retaining element in preparation for being coupled to an article.

As shown in FIG. 16B, in this embodiment the retaining element 950 is a magnetic plate. Either the entire retaining element 950 may be formed of a magnetic material or regions of the retaining element 950 that are aligned with the magnets 901-904 on the retaining element 900 may have magnets thereon. This further reduces the possibility of a user being stabbed by the retaining element 900 while still ensuring that the retaining 900 is securely retained on the article of clothing or lapel 170.

It should be appreciated that the different features in the different embodiments may be combined in any number of ways. Thus, for each embodiment, one or more features that were described with reference to one of the other embodiments may be added to that embodiment. Thus, many permutations of the invention are possible and may fall within the scope of the claimed invention. While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An attachment device for coupling a floral arrangement to an article, the attachment device comprising:
   a support element comprising:
   a rib member extending from a first end face to a second end face, the rib member having a bottom surface, a first aperture in the first end face, and a second aperture in the second end face;
   a first post extending from the bottom surface of the rib member; and
   a second post extending from the bottom surface of the rib member, the second post being spaced apart from the first post, wherein a receiving cavity is defined by the rib member and the first and second posts,
   wherein the first end face of the rib member, the second end face of the rib member, a front surface of the first post, and a front surface of the second post are coplanar;
   a retaining element comprising a body and first and second pins extending from the body; and
   wherein the retaining element is detachably coupled to the support element with the first pin of the retaining element extending through the first aperture of the rib member and the second pin of the retaining element extending through the second aperture of the rib member.

2. The attachment device according to claim 1 wherein the rib member has an inner surface that faces the receiving cavity and an opposite outer surface, the rib member being arcuate such that the inner surface of the rib member is concave and the outer surface of the rib member is convex.

3. The attachment device according to claim 2 further comprising a protuberance extending from the inner surface of the rib member into the receiving cavity, wherein the protuberance is centrally located along the inner surface of the rib member so as to be equidistant from each of the first and second posts.

4. The attachment device according to claim 2 wherein the first and second posts each comprise a first side surface that face one another such that the receiving cavity is defined by the inner surface of the rib member and the first side surfaces of the first and second posts.

5. An attachment device for coupling a floral arrangement to an article, the attachment device comprising:
   a support element comprising:
      a rib member having a bottom surface, a first aperture, and a second aperture;
      a first post extending from the bottom surface of the rib member;
      a second post extending from the bottom surface of the rib member, the second post being spaced apart from the first post, wherein the first and second posts each comprise a first side surface that face one another such that a receiving cavity is defined by the inner surface of the rib member and the first side surfaces of the first and second posts;
      wherein the rib member has an inner surface that faces the receiving cavity and an opposite outer surface, the rib member being arcuate such that the inner surface of the rib member is concave and the outer surface of the rib member is convex; and
      wherein the first side surfaces of the first and second posts are spaced apart by a distance that continually decreases with increasing distance from the bottom surface of the rib member for at least a portion of a length of the first and second posts;
   a retaining element comprising a body and first and second pins extending from the body; and
   wherein the retaining element is detachably coupled to the support element with the first pin of the retaining element extending through the first aperture of the rib member and the second pin of the retaining element extending through the second aperture of the rib member.

6. The attachment device according to claim 5 wherein the first post extends from the bottom surface of the rib member to a free end and the second post extends from the bottom surface of the rib member to a free end, each of the first and second posts comprising an upper portion that is adjacent to the rib member and a lower portion that extends from the upper portion to the free end, wherein the distance between the first side surfaces of the first and second posts continually decreases with increasing distance from the bottom surface of the rib member along the upper portions of the first and second posts, and wherein the distance between the first side surfaces of the first and second posts is constant along the lower portions of the first and second posts.

7. The attachment device according to claim 1 wherein the first post extends from the bottom surface of the rib member adjacent to the first end of the rib member and the second post extends from the bottom surface of the rib member adjacent to the second end of the rib member, a portion of the bottom surface of the rib member located between the first and second posts being exposed.

8. The attachment device according to claim 1 wherein the receiving cavity is configured to receive a stem of a floral arrangement that extends along an axis such that the first and second posts of the support element are located on opposite sides of the stem and the rib member circumferentially surrounds a portion of the stem.

9. An attachment device for coupling a floral arrangement to an article, the attachment device comprising:
   a support element comprising:
      an arcuate rib member comprising a first end, a second end, and a bottom surface, a first aperture formed into the first end of the arcuate rib member and a second aperture formed into the second end of the arcuate rib member;
      a first post extending from the bottom surface of the arcuate rib member at the first end of the arcuate rib member; and
      a second post extending from the bottom surface of the arcuate rib member at the second end of the arcuate rib member, the second post being spaced apart from the first post, wherein a receiving cavity is defined by the arcuate rib member and the first and second posts;
   wherein a distance between the first and second posts continually decreases with increasing distance from the bottom surface of the rib member.

10. The attachment device according to claim 9 wherein the first and second posts converge towards one another with distance from the arcuate rib member towards distal ends of the first and second posts.

11. The attachment device according to claim 10 wherein a distance between the first and second posts is greater adjacent to the arcuate rib member than at the distal ends of the first and second posts.

12. The attachment device according to claim 9 wherein the arcuate rib member comprises a concave inner surface that faces the receiving cavity and a convex outer surface.

13. The attachment device according to claim 12 further comprising a protuberance extending from the concave inner surface of the arcuate rib member into the receiving cavity.

14. The attachment device according to claim 13 wherein the protuberance has a triangular shape.

15. The attachment device according to claim 9 further comprising:
   a retaining element comprising a body and first and second pins extending from the body; and
   wherein the retaining element is detachably coupled to the support element with the first pin of the retaining element extending through the first aperture of the arcuate rib member and the second pin of the retaining element extending through the second aperture of the arcuate rib member.

* * * * *